United States Patent
Jang et al.

(10) Patent No.: US 9,438,313 B2
(45) Date of Patent: Sep. 6, 2016

(54) SMART NFC ANTENNA MATCHING NETWORK SYSTEM HAVING MULTIPLE ANTENNAS AND USER DEVICE INCLUDING THE SAME

(71) Applicant: Samsung Electronics Co., Ltd., Suwon-Si, Gyeonggi-Do (KR)

(72) Inventors: Yohan Jang, Seoul (KR); Iljong Song, Suwon-si (KR); Hyoughwan Roh, Seoul (KR); Youngki Lee, Incheon (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 65 days.

(21) Appl. No.: 14/559,198

(22) Filed: Dec. 3, 2014

(65) Prior Publication Data

US 2015/0180542 A1 Jun. 25, 2015

(30) Foreign Application Priority Data

Dec. 20, 2013 (KR) ........................ 10-2013-0160582

(51) Int. Cl.
*H04B 5/00* (2006.01)

(52) U.S. Cl.
CPC .......... *H04B 5/0031* (2013.01); *H04B 5/0056* (2013.01); *H04B 5/0081* (2013.01)

(58) Field of Classification Search
None
See application file for complete search history.

(56) References Cited

U.S. PATENT DOCUMENTS

| | | | |
|---|---|---|---|
| 7,347,379 B2 | 3/2008 | Ward et al. | |
| 7,494,069 B2 | 2/2009 | Shimada | |
| 7,876,284 B2 | 1/2011 | Mizoroki et al. | |
| 8,041,295 B2 | 10/2011 | Simada | |
| 8,288,893 B2 | 10/2012 | Cook et al. | |
| 8,378,917 B2 | 2/2013 | Yoneda et al. | |
| 2005/0087599 A1 | 4/2005 | Ward et al. | |
| 2007/0004456 A1 | 1/2007 | Shimada | |
| 2009/0061768 A1 | 3/2009 | Simada | |
| 2009/0091501 A1 | 4/2009 | Mizoroki et al. | |
| 2010/0044444 A1 | 2/2010 | Jain et al. | |
| 2010/0117454 A1 | 5/2010 | Cook et al. | |
| 2010/0194660 A1 | 8/2010 | Yoneda et al. | |
| 2011/0128125 A1 | 6/2011 | Kai et al. | |
| 2011/0266883 A1 | 11/2011 | Eray | |
| 2014/0154980 A1 | 6/2014 | Jang et al. | |

FOREIGN PATENT DOCUMENTS

| | | |
|---|---|---|
| JP | 2000067194 A | 3/2000 |
| JP | 2005323019 A | 11/2005 |

(Continued)

*Primary Examiner* — David Bilodeau
(74) *Attorney, Agent, or Firm* — Harness, Dickey & Pierce, P.L.C.

(57) ABSTRACT

At least one example embodiment provides a near field communication (NFC) antenna matching network system connected to an NFC transceiver. The NFC antenna matching network system includes a matching circuit connected to first and second antenna terminals and to the NFC transceiver. The matching circuit is configured to match impedances of the NFC antenna network matching system and the NFC transceiver. The NFC antenna matching network system includes a plurality of NFC antennas connected in parallel with the first and second antenna terminals. Each of the NFC antennas includes a source coil and a resonance coil. The source coil is connected between the first antenna terminal and the second antenna terminal. The resonance coil is physically separated from the source coil and configured to exchange signals with the source coil via inductive coupling.

19 Claims, 14 Drawing Sheets

(56) References Cited

FOREIGN PATENT DOCUMENTS

| | | |
|---|---|---|
| JP | 2006262055 A | 9/2006 |
| JP | 2006302219 A | 11/2006 |
| JP | 2009075966 A | 4/2009 |
| JP | 2010004257 A | 1/2010 |
| JP | 2011091500 A | 5/2011 |
| JP | 5218369 B2 | 6/2013 |
| KR | 1020080073120 A | 8/2008 |
| KR | 1020110115767 A | 10/2011 |
| KR | 101080651-BI | 11/2011 |
| KR | 101121442 B1 | 3/2012 |
| KR | 101210941 B1 | 12/2012 |
| KR | 1020140072643 A | 6/2014 |

SMART NFC ANTENNA MATCHING NETWORK SYSTEM HAVING MULTIPLE ANTENNAS AND USER DEVICE INCLUDING THE SAME

CROSS-REFERENCE TO RELATED APPLICATIONS

A claim for priority under 35 U.S.C. §119 is made to Korean Patent Application No. 10-2013-0160582 filed Dec. 20, 2013, in the Korean Intellectual Property Office, the entire contents of which are hereby incorporated by reference.

BACKGROUND

The inventive concepts described herein relate to a Near Field Communication (hereinafter, referred to as "NFC") antenna matching network system for a contactless mobile point of sale (POS) using NFC.

In general, RFID (Radio Frequency Identification) technology may allow for automatic recognition using radio waves. An RFID system may be also called a radio frequency recognition system configured to recognize prestored or predetermined information wirelessly using radio waves such as ultra-short waves or long waves.

An RFID system may use signals to be free from ambient environment factors such as snow, rain, dust and magnetic flux, for example. Furthermore, the recognition speed may be fast such that recognition is possible even in transit, and at long distances. The RFID system may be provided with an intrinsic ID (identification) in the manufacturing process to protect the system from being refabricated or counterfeited.

RFID systems may recognize information recorded in a tag via a wireless communication. The recorded information may belong to RFID fields, for example a bar code label, a magnetic stripe, etc. An RFID reader may receive information stored in the tag via an antenna. The RFID reader may recognize and analyze the received information, and may obtain characteristic and circumstance information for a product where the tag is applied or incorporated.

The RFID system may include, for example, a reader, an antenna, a tag, and/or the like. The antenna may perform an intermediation function between the tag and the reader. A power and a signal may be sent to the tag via the antenna using a wireless communication such that the tag is activated. Further, a response from the tag may be received via the antenna.

Meanwhile, NFC (Near Field Communication) technology which is in the field of RFID systems may use a frequency (e.g., 13.56 MHz) of a high frequency band and transmit data at a distance with low power. The NFC scheme is standardized in ISO/IEC 18092. The NFC scheme may perform a short distance radio communication using various frequency signals including 125 kHz, 135 kHz, and 900 kHz in addition to the 13.56 MHz.

An NFC device may have such advantages of communicating or being compatible with existing information devices including portable wireless terminals and notebook computers through exchanges of address books, games, and MP3 files. NFC technology and its frequency bands may have high reliability and is already in use for public transportation and mobile phone payment. NFC technology may be utilized for future information terminals capable of obtaining a variety of information by approaching a tag stored with predetermined information.

A mobile phone embedded with NFC chips is in an early distribution stage and NFC technology is expected to be widely adopted in mobile terminals including portable wireless terminals. The portable terminals embedded with NFC chips are generally mounted with an NFC antenna and may communicate with an external reader via the NFC antenna.

SUMMARY

At least one aspect of example embodiment of the inventive concepts is directed to a near field communication (hereinafter, referred to as "NFC") antenna matching network system connected to an NFC transceiver. The NFC antenna matching network system includes a matching circuit connected to first and second antenna terminals and to the NFC transceiver. The matching circuit is configured to match impedances of the NFC antenna network matching system and the NFC transceiver. The NFC antenna matching network system includes a plurality of NFC antennas connected in parallel with the first and second antenna terminals. Each of the NFC antennas includes a source coil and a resonance coil. The source coil is connected between the first antenna terminal and the second antenna terminal. The resonance coil is physically separated from the source coil and configured to exchange signals with the source coil via inductive coupling.

According to at least one example embodiment, the matching circuit comprises a first capacitor connected between the first antenna terminal and the NFC transceiver. The matching circuit comprises a second capacitor connected between the second antenna terminal and the NFC transceiver.

According to at least one example embodiment, the matching circuit comprises at least one of a first resistor and a first inductor connected between the first capacitor and the first antenna terminal. The matching circuit also comprises at least one of a second resistor and a second inductor connected between the second capacitor and the second antenna terminal.

According to at least one example embodiment, each of the NFC antennas further comprises a third capacitor connected in parallel with the resonance coil.

According to at least one example embodiment, at least one of a third resistor and a third inductor is connected in series between the resonance coil and the third capacitor.

According to at least one example embodiment, the resonance coil of each of the NFC antennas and the third capacitor form a parallel resonator for each of the NFC antennas. The source coil of each of the NFC antennas and the first and second capacitors form a serial resonator for each of the NFC antennas. The parallel resonator of each of the NFC antennas is physically separated from the serial resonator of each of the NFC antennas.

According to at least one example embodiment, the source coil of each of the NFC antennas is a first conductive line having one of a single-loop shape and a multi-loop shape. The resonance coil of each of the NFC antennas is a second conductive line having a spiral shape.

According to at least one example embodiment, antenna areas where the NFC antennas are located have different sizes, and each of the NFC antennas has a different size.

According to at least one example embodiment, a user device includes a near field communication (NFC) transceiver, and an NFC antenna matching network system connected to the NFC transceiver. The NFC antenna matching network system includes a first capacitor connected between a first terminal of the NFC transceiver and a first antenna terminal. The NFC antenna matching network system includes a second capacitor connected between a second terminal of the NFC transceiver and a second antenna terminal. The NFC antenna matching network system includes a plurality of source coils connected in parallel between the first antenna terminal and the second antenna terminal. The NFC antenna matching network system includes a plurality of parallel resonators corresponding to the source coils, each of the parallel resonators being physically separated from a corresponding one of the plurality of source coils.

According to at least one example embodiment, the plurality of source coils includes at least first and second source coils. The plurality of parallel resonators includes at least first and second parallel resonators. The first source coil and the first parallel resonator form a first NFC antenna, and the second source coil and the second parallel resonator form a second NFC antenna.

According to at least one example embodiment, antenna areas where the first and second NFC antennas are located have different sizes, and each of the NFC antennas has a different size.

According to at least one example embodiment, the first and second NFC antennas are disposed at different locations of the user device.

According to at least one example embodiment, each of the parallel resonators includes a resonance coil and a capacitor connected in parallel with the resonance coil.

According to at least one example embodiment, each of the source coils is a first conductive line having one of a single-loop shape and a multi-loop shape, and the resonance coil of each of the parallel resonators is a second conductive line having a spiral shape.

According to at least one example embodiment, a near field communication (NFC) antenna matching network system is connected to an NFC transceiver, the NFC antenna matching network system. The NFC antenna matching network system includes a matching circuit connected to first and second antenna terminals and to the NFC transceiver. The NFC antenna matching network system includes a plurality of source coils connected in series between the first antenna terminal and the second antenna terminal. The matching circuit is configured to match impedances of the NFC antenna matching network system and the NFC transceiver. The NFC antenna matching network system includes a plurality of resonance coils corresponding to the source coils, each of the plurality of resonance coils being physically separated from a corresponding one of the plurality of source coils.

According to at least one example embodiment, a near field communication (NFC) antenna matching network system is connected to an NFC transceiver for a mobile point of sale (POS). The NFC antenna matching network system includes a source coil connected between first and second terminals of the NFC transceiver. The NFC antenna matching network system includes a resonance coil physically separated from the source coil. The resonance coil has a plurality of winding turns. A distance between an innermost edge of at least one of the winding turns adjacent to an outermost edge of the source coil and the outermost edge of the source coil is within about 0 mm to about 1 mm.

According to at least one example embodiment, the resonance coil has inductance of about 4 µH to about 9 µH.

According to at least one example embodiment, the resonance coil is located within an area of about 20 cm² to about 54 cm².

According to at least one example embodiment, the resonance coil has a width of about 0.5 mm to about 1.2 mm and a distance between adjacent winding turns of the resonance coil is within 0.3 mm to 0.6 mm.

According to at least one example embodiment, a portable terminal for a mobile point of sale (POS) includes a near field communication (NFC) transceiver, and an NFC antenna matching network system connected to the NFC transceiver. The NFC transceiver includes a reader circuit, a card circuit, and a connection unit connecting the reader circuit and the card circuit to the NFC antenna matching network system. The NFC antenna matching network system includes a first capacitor having one end connected to the connection unit. The NFC antenna matching network system includes a source coil having one end connected to the other end of the first capacitor. The NFC antenna matching network includes a second capacitor having one end connected to the connection unit and the other end connected to the other end of the source coil. The NFC antenna matching network system includes a parallel resonator having a resonance coil and being physically separated from the source coil. The resonance coil has a plurality of winding turns. According to at least one example embodiment, a distance between an innermost edge of at least one of the winding turns adjacent to an outermost edge of the source coil and the outermost edge of the source coil is within about 0 mm to about 1 mm. The resonance coil is located within an area of about 20 cm² to about 54 cm². The resonance coil has inductance of about 4 µH to about 9 µH. The resonance coil has a width of about 0.5 mm to about 1.2 mm and distance between adjacent winding turns of the resonance coil is within about 0.3 mm to about 0.6 mm.

According to at least one example embodiment, a device includes at least one antenna including a serial resonator and a parallel resonator electrically isolated from each other and configured to exchange signals via inductive coupling. The device includes a transceiver configured to receive and transmit the exchanged signals. The device includes a matching circuit electrically connected between the transceiver and the serial resonator, the matching circuit being configured to match impedances within the device.

According to at least one example embodiment, the at least one antenna is a plurality of antennas. Each of the plurality of antennas has a different size. The serial resonators of the plurality of antennas are connected in parallel with one another.

According to at least one example embodiment, the at least one antenna is a plurality of antennas. Each of the plurality of antennas has a different size. The serial resonators of the plurality of antennas are connected in series with one another.

According to at least one example embodiment, the serial resonator includes a first coil. The matching circuit includes a first capacitor and a second capacitor. The first capacitor is connected between a first end of the first coil and the transceiver, and the second capacitor is connected between a second end of the first coil and the transceiver.

According to at least one example embodiment, the parallel resonator includes a second coil connected in parallel with a capacitance.

According to at least one example embodiment of the inventive concepts, credit card purchases and payments are made using one terminal (e.g., a smart phone). For example, in a portable terminal (e.g., a smart phone) in which an NFC chip is embedded, the portable terminal is used as a purchasing device by inputting personal card information in the portable terminal. Also, the portable terminal (e.g., a smart phone) is used as payment device by recognizing an external mobile card or a credit card via an NFC antenna matching network system of the inventive concepts. Thus, the portable terminal (e.g., the smart phone) of the inventive concepts supports credit card purchases and credit card payments without a dongle for POS.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION OF EXAMPLE EMBODIMENTS

Figure 1:
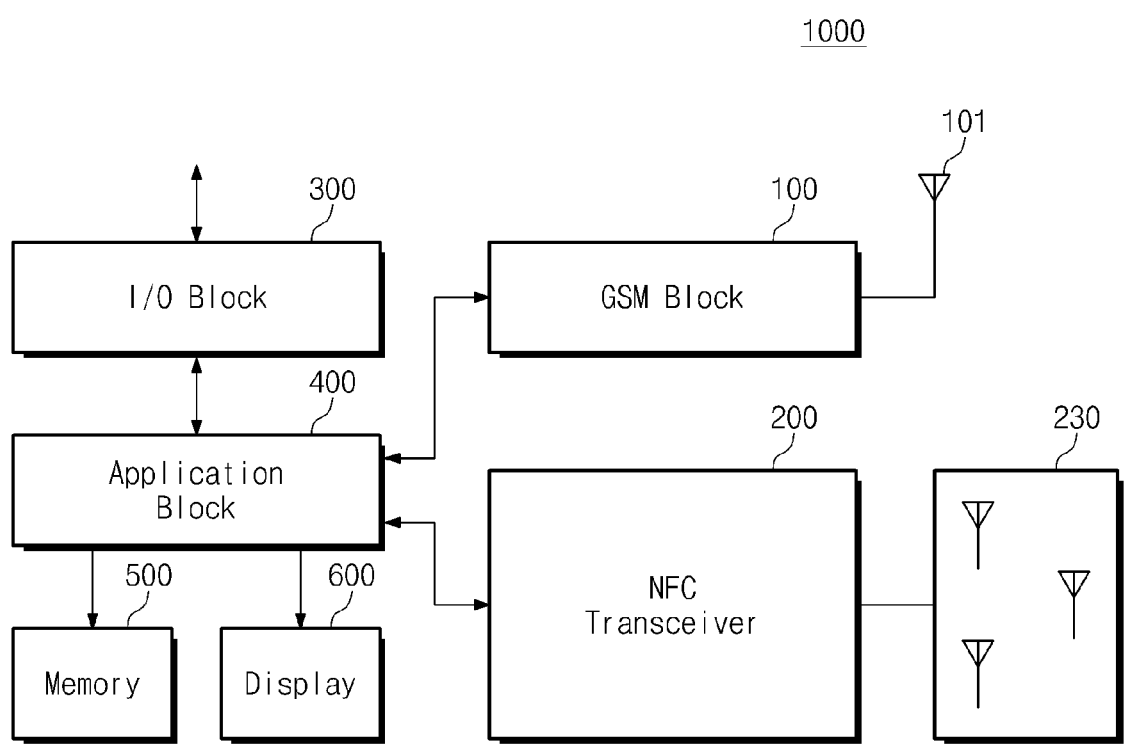
FIG. 1 is a block diagram of an example device in which at least one example embodiment may be implemented.

Inventive concepts will now be described more fully with reference to the accompanying drawings, in which example embodiments of are shown. These example embodiments are provided so that this disclosure will be thorough and complete, and will fully convey inventive concepts of to those skilled in the art. Inventive concepts may be embodied in many different forms with a variety of modifications, and a few embodiments will be illustrated in drawings and explained in detail. However, this should not be construed as being limited to example embodiments set forth herein, and rather, it should be understood that changes may be made in these example embodiments without departing from the principles and spirit of inventive concepts, the scope of which are defined in the claims and their equivalents. Like numbers refer to like elements throughout. In the drawings, the thicknesses of layers and regions are exaggerated for clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware in existing electronic systems (e.g., electronic imaging systems, image processing systems, digital point-and-shoot cameras, personal digital assistants (PDAs), smartphones, tablet personal computers (PCs), laptop computers, etc.). Such existing hardware may include one or more Central Processing Units (CPUs), digital signal processors (DSPs), application-specific-integrated-circuits (ASICs), field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible or non-transitory machine readable mediums for storing information. The term "computer-readable medium" may include, but is not limited to, portable or fixed storage devices, optical storage devices, and various other tangible or non-transitory mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors may be programmed to perform the necessary tasks, thereby being transformed into special purpose processor(s) or computer(s).

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "includes", "including", "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "and/or" includes any and all combinations of one or more of the associated listed items. Expressions such as "at least one of," when preceding a list of elements, modify the entire list of elements and do not modify the individual elements of the list.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

FIG. 1 is a block diagram of an example device in which at least one example embodiment of the inventive concepts may be implemented. A device illustrating in FIG. 1 may be a mobile phone as a user device. However, it should be understood that the inventive concepts are not limited to mobile phones.

Referring to FIG. 1, a mobile phone 1000 includes a Global System for Mobile Communication (GSM) block 100, a Near Field Communication (NFC) transceiver 200, an input/output (I/O) block 300, an application block 400, a memory 500, and a display 600. The components/blocks of the mobile phone 1000 in FIG. 1 are example components/blocks. However, the mobile phone 100 may contain more or fewer components/blocks if desired. Further, although FIG. 1 shows using GSM technology, the mobile phone 100 may instead be implemented using other technologies such as CDMA (Code Division Multiple Access) also. The blocks of FIG. 1 may be implemented in an integrated circuit (IC) form. Alternatively, some of the blocks may be implemented in an IC form, while other blocks may be in a discrete form.

GSM block 100 is connected to an antenna 101 and operates to provide wireless telephone operations. The GSM block 100 contains receiver and transmitter sections internally (not shown) to perform corresponding receiving and transmitting operations.

The NFC transceiver 200 uses inductive coupling for wireless communication and is configured to receive and transmit NFC signals. The NFC transceiver 200 provides NFC signals to an NFC antenna matching network system 230, and the NFC antenna matching network system 230 transmits NFC signals through inductive coupling. The NFC antenna matching network system 230 receives NFC signals (provided from another NFC device (not shown)) and provides the received NFC signals to the NFC transceiver 200. The NFC antenna matching network system 230, as illustrated in FIG. 1, includes a plurality of antennas. The NFC antenna matching network system 230 will be more fully described later.

The NFC transceiver 200 operates consistent with specifications described in Near Field Communication Interface and Protocol-1 (NFCIP-1) and Near Field Communication Interface and Protocol-2 (NFCIP-2) and standardized in ECMA-340, ISO/IEC 18092, ETSI TS 102 190, ISO 21481, ECMA 352, ETSI TS 102 312, etc.

The application block 400 contains corresponding hardware circuitry (e.g., one or more processors) and operates to provide various user applications on mobile phone 1000. The user applications may include voice calling operations, data transfers, etc. The application block 400 operates in conjunction with the GSM block 100 to provide such features. The application block 400 includes a program for a mobile point of sales (hereinafter, referred to as a mobile POS). Such a program provides credit card purchase and payment functions using a mobile phone, for example, a smart phone.

The display 600 displays images in response to the corresponding display signals received from the application block 400. The images may be generated by a camera provided in mobile phone 100 (camera not shown in FIG. 1). The display 600 contains a memory (e.g., a frame buffer) for temporary storage of pixel values for image refresh purposes and may be implemented, for example, as a liquid crystal display screen with associated control circuits. The I/O block 300 provides a user with the facility to provide a user with an input function. In addition, the I/O block 300 may provide outputs that are received via the application block 400.

The memory 500 stores program (instructions) and/or data used by the applications block 400 and is implemented with RAM, ROM, flash memory, etc. Thus, the memory 500 contains volatile as well as nonvolatile storage elements.

The NFC antenna matching network system 230 communicates with external devices by inductive coupling and is used for both transmission and reception of NFC signals.

The NFC antenna matching network system 230 includes a plurality of antennas (or, NFC antennas) with different sizes. The antennas, also, are installed at different positions (e.g., on a front surface, a rear surface, a center, an outside, a flip cover, a battery pack, and the like of the mobile phone 1000). The antennas will be more fully described later. Because one NFC transceiver 200 uses a plurality of antennas, it is possible to improve NFC functions for a user, and to achieve desired (or, alternatively, maximal) performance between the antennas and the NFC transceiver 200 as an NFC chip.

Transmission and reception of NFC signals by the NFC transceiver 200 may be performed with a time division multiplexed (TDM) method. Accordingly, a time interval in which the NFC transceiver 200 transmits NFC signals may be termed "a transmit interval," and the corresponding mode of operation of the NFC transceiver 200 may be referred to as a 'transmit mode' or "NFC reader transmit mode". Similarly, a time interval in which the NFC transceiver 200 receives NFC signals may be termed "a receive interval," and the corresponding mode of operation of the NFC transceiver 200 may be referred to as a 'receive mode' or "NFC tag receive mode".

Figure 2:
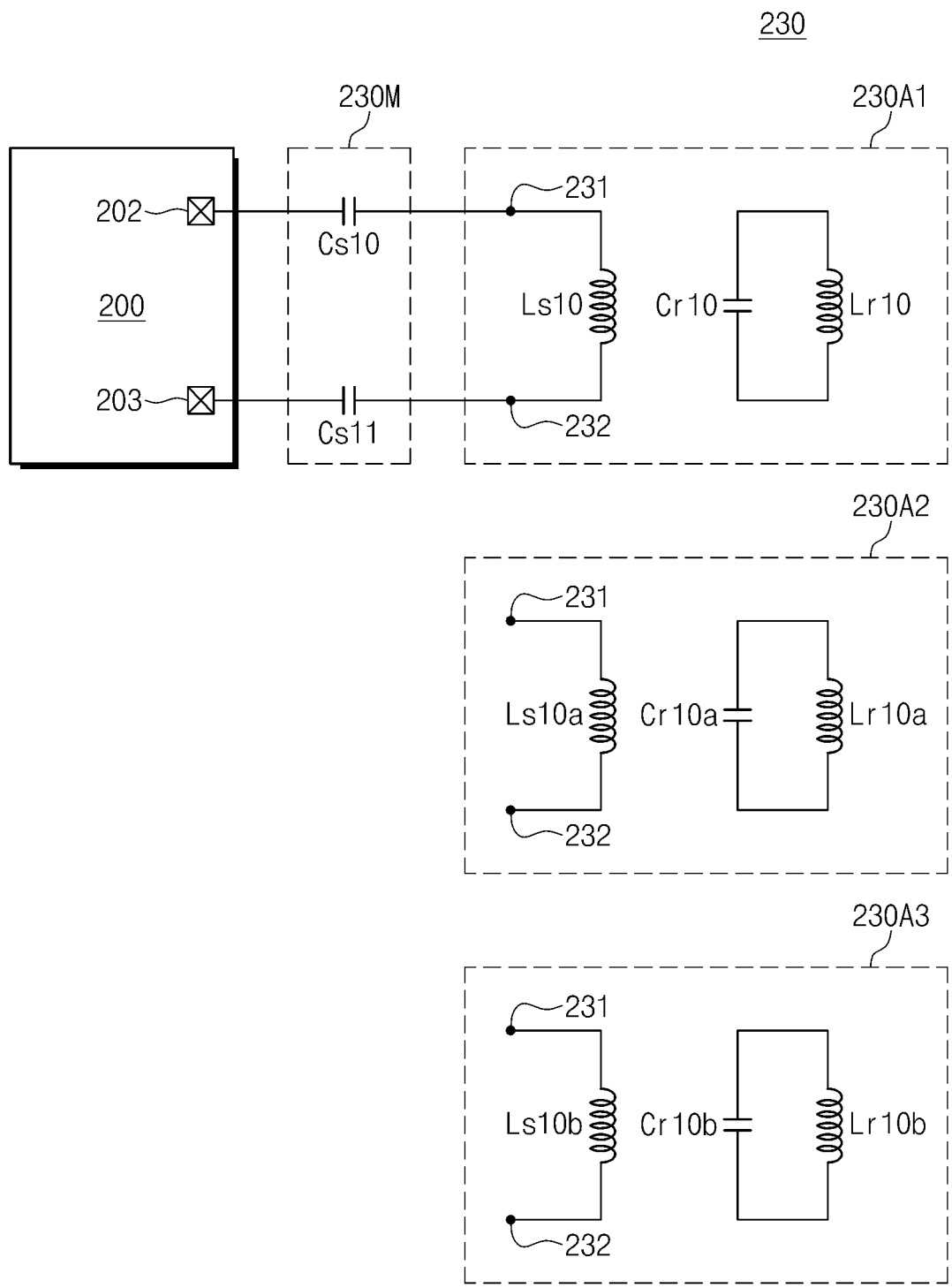
FIG. 2 is a diagram schematically illustrating an NFC antenna matching network system shown in FIG. 1, according to at least one example embodiment of the inventive concepts.

FIG. 2 is a diagram schematically illustrating an NFC antenna matching network system shown in FIG. 1, according to at least one example embodiment of the inventive concepts.

Referring to FIG. 2, a NFC antenna matching network system 230 according to at least one example embodiment of the inventive concepts includes capacitors Cs10, Cs11, and Cr10 and inductors Ls10 and Lr10. The NFC antenna matching network system 230 is electrically connected with chip terminals 202 and 203 of an NFC transceiver 200 (or, referred to as an NFC chip). FIG. 2 illustrates an example in which the NFC transceiver 200 includes only two terminals. However, the inventive concepts are not limited thereto.

The capacitor Cs10 is connected between the chip terminal 202 and an antenna terminal 231, and the capacitor Cs11 is connected between the chip terminal 203 and the antenna terminal 231. As a source coil, an inductor Ls10 is connected between the antenna terminals 231 and 232. The inductor Ls10 and the capacitors Cs10 and Cs11 may form a serial resonator. In at least one example embodiment, the inductor Ls10 may be referred to as a source coil. The capacitor Cr10 and the inductor Lr10 may form a parallel resonator. As illustrated in FIG. 2, the parallel resonator formed of the capacitor Cr10 and the inductor Lr10 may be physically separated (or spaced apart) from the serial resonator that is electrically connected with the chip terminals 202 and 203. In example embodiments, the inductor Lr10 may be referred to as a resonant coil. The source coil may be physically separated from the resonant coil. In other words, the resonant coil Lr10 may be electrically floated (or isolated) from the source coil Ls10. In other words, the source coil Ls10 may be supplied with a power from a reader of the NFC transceiver 200, and the resonant coil Lr10 may be supplied with a power from the source coil Ls10 by magnetic induction. The resonant coil Lr10 transmits or receives NFC signals by parallel resonance.

Although not shown in FIG. 2, the NFC transceiver 200 may include a reader, a card circuit, etc. The reader and card circuit of the NFC transceiver 200 are connected to a matching circuit 230M through the chip terminals 202 and 203. The matching circuit 230M may be configured to match impedances within the mobile phone 1000. For example, the matching circuit 230M may match an impedance of the NFC transceiver 200 to an impedance of inductor Ls10. Also, the reader of the NFC transceiver 200 is connected to the matching circuit 230M through the chip terminals 202 and 203, and the card circuit thereof is connected to the matching circuit 230M through other chip terminals. However, it should be understood that connection between the reader and card circuit of the NFC transceiver 200 and the matching circuit 230M is not limited to this disclosure.

In at least one example embodiment, the capacitor Cr10 connected in parallel with the resonant coil Lr10 may be a lumped (or separate) element or a parasitic capacitance of the resonant coil Lr10. Here, if a resonance frequency (e.g., 13.56 MHz) is obtained through the resonant coil Lr10, the capacitor Cr10 of the parallel resonator may be a parasitic capacitance. If the resonance frequency is not obtained through the resonant coil Lr10, the capacitor Cr10 of the parallel resonator may be a lumped (or separate) element.

At a transmission mode of the NFC transceiver 200, the source coil Ls10 (or, inductance of the source coil Ls10) and the capacitors Cs10 and Cs11 may form a serial resonator. When a current supplied from a reader of the NFC transceiver 200 flows to the source coil Ls10, a magnetic field may be generated around the source coil Ls10. At this time, the magnetic field formed at the source coil Ls10 may enable an induced current to flow at the resonant coil Lr10 being floated (or electrically isolated from LS10). In other words, the resonant coil Lr10 may be supplied with a power from the source coil Ls10 by the magnetic induction. Capacitance of the capacitor Cr10 and inductance of the resonant coil Lr10 may resonate with a center frequency (e.g., 13.56 MHz) of a band of frequencies occupied by an NFC signal output from the reader according to a power supplied by the magnetic induction. In a transmission mode of the NFC transceiver 200, the reader may transmit NFC signals through the chip terminals 202 and 203.

In a reception mode of the NFC transceiver 200, the source coil Ls10 (or, inductance of the source coil Ls10) and the capacitors Cs10 and Cs11 may form a serial resonator. The parallel resonator formed of the resonant coil Lr10 and the capacitor Cr10 may resonate with an NFC signal transmitted from an external NFC device. An induced current may flow at the source coil Ls10 by a magnetic field formed around the resonant coil Lr10. In other words, the source coil Ls10 may be supplied with a power from the resonant coil Lr10 by the magnetic induction. NFC signals received via the parallel resonator may be provided to the reader via the serial resonator formed of the capacitors Cs10 and Cs11 and the source coil Ls10. In the reception mode of the NFC transceiver 200, the reader may receive NFC signals via the chip terminals 202 and 203.

Although not shown in FIG. 2, a capacitor may be connected in parallel between the antenna terminals 231 and 232 if desired. That is, a capacitor connected in parallel between the antenna terminals 231 and 232 may be selectively used.

In at least one example embodiment, the capacitors Cs10 and Cs11 form the matching circuit 230M of the NFC antenna network system 230. If the capacitor Cr10 is a parasitic capacitance, the source coil LS10 and the resonance coil Lr10 form a first NFC antenna 230A1. Alternatively, if the capacitor Cr10 is formed of a lumped (or separate) capacitor, the source coil LS10, the capacitor Cr10, and the resonance coil Lr10 form the first NFC antenna 230A1.

In a typical NFC antenna matching network system, capacitors for serial resonance and capacitors for parallel resonance may be electrically connected with an antenna. In this case, the capacitors for serial resonance may be affected by the capacitors for parallel resonance in terms of impedance, or the capacitors for parallel resonance may be affected by the capacitors for serial resonance in terms of impedance. This influence may cause lowering of a transfer performance (or, a quality factor) for typical NFC antenna matching network systems. For example, high impedances associated with typical NFC antenna matching network systems may limit performance of the system when a magnetic field is generated in a reader mode.

In contrast, the NFC antenna matching network system 230 according to at least one example embodiment of the inventive concepts may transmit and receive NFC signals under a condition where a serial resonator suitable for a transmission mode (i.e., advantageous to form a magnetic field) and a parallel resonator suitable for a reception mode (i.e., advantageous to be supplied with a power) are physically separated (or spaced apart). In this case, the serial resonator and the parallel resonator may influence each other in terms of impedance. Compared with a typical NFC antenna matching network system, an impedance of the resonant coil Lr10 may be low because the resonant coil Lr10 is floated (or electrically isolated). Accordingly, an impedance of the source coil Lr10 is reduced. As this impedance is reduced, the amount of current flowing via the source coil Ls10 may increase. Thus, the amount of current induced at the resonant coil Lr10 (or, the strength of a magnetic field) may increase. As the amount of current induced or the strength of a magnetic field increases, a recognition distance or a reception voltage may increase. In this case, as the impedance of a reader mode of a serial resonance becomes low, reception of a high current is possible. As the impedance of a reader mode of a parallel resonance become high, a high voltage is induced. An increase in the magnetic field enables a number of possible antenna locations of the NFC antenna network system to increase. Therefore, performance of a small-sized antenna may be improved.

As shown in FIG. 2, the NFC antenna network system 230 further comprises a second NFC antenna 230A2. The second NFC antenna 230A2 is connected to the matching circuit 230M, that is, to the antenna terminals 231 and 232 and includes an inductor Ls10a, a capacitor Cr10a, and an inductor Lr10a. As a source coil, an inductor Ls10a is connected between the antenna terminals 231 and 232. The inductor Ls10a and the capacitors Cs10 and Cs11 may form a serial resonator. In at least one example embodiment, the inductor Ls10a may be referred to as a source coil. The capacitor Cr10a and the inductor Lr10a may form a parallel resonator. Like the first NFC antenna 230A1, the parallel resonator formed of the capacitor Cr10a and the inductor Lr10a may be physically separated (or spaced apart) from the serial resonator that is electrically connected with the chip terminals 202 and 203. In at least one example embodiment, the inductor Lr10a may be referred to as a resonant coil. In the second NFC antenna 230A2, the source coil may be physically separated from the resonant coil. In other words, the resonant coil Lr10a may be electrically floated (or electrically isolated) from the source coil Ls10a. In other words, the source coil Ls10a may be supplied with a power from a reader of NFC transceiver 200, and the resonant coil Lr10a may be supplied with a power from the source coil Ls10a by magnetic induction. The resonant coil Lr10a transmits or receives NFC signals by parallel resonance.

The second NFC antenna 230A2 also obtains the same effect as the first NFC antenna 230A1, that is, the above-described impedance reduction effect. Thus, the amount of current flowing via the source coil Ls10a may be increased relative to typical NFC network systems. This may mean that the amount of current induced at the resonant coil Lr10a (or, the strength of a magnetic field) increases. As the amount of current induced or the strength of a magnetic field increases, a recognition distance or a reception voltage may increase. In this case, as the impedance of a reader mode of a serial resonance becomes low, reception of a high current is possible. As the impedance of a reader mode of a parallel resonance become high, a high voltage is induced. The increase in a magnetic field enables a number of possible antenna locations to increase. Therefore, performance of a small-sized antenna may be improved.

Still referring to FIG. 2, the NFC antenna network system 230 further comprises a third NFC antenna 230A3. The third NFC antenna 230A3 is connected to the matching circuit 230M, that is, to the antenna terminals 231 and 232 and includes an inductor Ls10b, a capacitor Cr10b, and an inductor Lr10b. As a source coil, the inductor Ls10b is connected between the antenna terminals 231 and 232. The inductor Ls10b and the capacitors Cs10 and Cs11 may form a serial resonator. In at least one example embodiment, the inductor Ls10b may be referred to as a source coil. The capacitor Cr10b and the inductor Lr10b may form a parallel resonator. Like the first NFC antenna 230A1, the parallel resonator formed of the capacitor Cr10b and the inductor Lr10b may be physically separated (or spaced apart) from the serial resonator that is electrically connected with the chip terminals 202 and 203. In at least one example embodiment, the inductor Lr10b may be referred to as a resonant coil. In the third NFC antenna 230A2, the source coil may be physically separated (or spaced apart) from the resonant coil. In other words, the resonant coil Lr10b may be electrically floated (or electrically isolated) from the source coil Ls10b. In other words, the source coil Ls10b may be supplied with a power from a reader of the NFC transceiver 200, and the resonant coil Lr10b may be supplied with a power from the source coil Ls10b by magnetic induction. The resonant coil Lr10b transmits or receives NFC signals by parallel resonance.

The third NFC antenna 230A3 also obtains the same effect as the first NFC antenna 230A1, that is, the above-described impedance reduction effect. The amount of current flowing via the source coil Ls10b may increase relatively. This may mean that the amount of current induced at the resonant coil Lr10b (or, the strength of a magnetic field) increases. As the amount of current induced or the strength of a magnetic field increases, a recognition distance or a reception voltage may increase. In this case, as the impedance of a reader mode of a serial resonance becomes low, reception of a high current is possible. As the impedance of a reader mode of a parallel resonance become high, a high voltage is induced. The increase in a magnetic field enables a number of possible antenna locations to increase. Therefore, performance of a small-sized antenna may be improved.

According to at least one example embodiment of the inventive concepts, an area (hereinafter, referred to as a first antenna area) where the first NFC antenna 230A1 is formed, an area (hereinafter, referred to as a second antenna area) where the second NFC antenna 230A2 is formed, and an area (hereinafter, referred to as a third antenna area) where the third NFC antenna 230A2 is formed are different from one another in size. Also, the first to third antenna areas may be disposed at different locations of a mobile phone 1000. With this antenna structure, it is possible to tune a desired frequency of each NFC antenna with relative ease, and the number of possible antenna locations increases through an increase in a magnetic field. In the event that the serial resonator and the parallel resonator are physically separated from each other, it is possible to change a matching network to depending on the desired functions of NFC antennas.

An antenna size of an external reader (or, an area where an antenna is formed) may be variable according to desired uses/purposes. For example, the size of an antenna used in P2P (Peer-to-Peer) applications for simple data communications is different from the size of an antenna used in POS (Point Of Sales) applications for credit card payments. That is, communications are difficult between external readers with different sizes of antennas and a terminal where an NFC antenna with a single signal. In the inventive concepts, since NFC antennas with different sizes of antennas are mounted together with a terminal, an NFC antenna with an antenna size similar or equal to an antenna size of the external reader provides smooth communication with an external reader.

FIG. 2 illustrates an example in which the NFC antenna matching network system 230 includes three NFC antennas. However, it should be understood that the number of NFC antennas of the NFC antenna matching network system 230 is not limited to this disclosure. For example, the NFC antenna matching network system 230 may be implemented to include two NFC antennas or to include four or more NFC antennas. In FIG. 2, it should be understood that each of the source coils Ls10, Ls10a, and Ls10b may be connected in parallel with one another to the antenna terminals 231 and 232.

FIGS. 3 to 6 are diagrams illustrating a source coil and a resonant coil according to at least one example embodiment of the inventive concepts. A smart NFC antenna matching network system 230 according to the inventive concepts includes a source coil Ls10 and a resonant coil Lr10. Below, various shapes of the source coil Ls10 and the resonant coil Lr10 will be more fully described.

Figure 3:
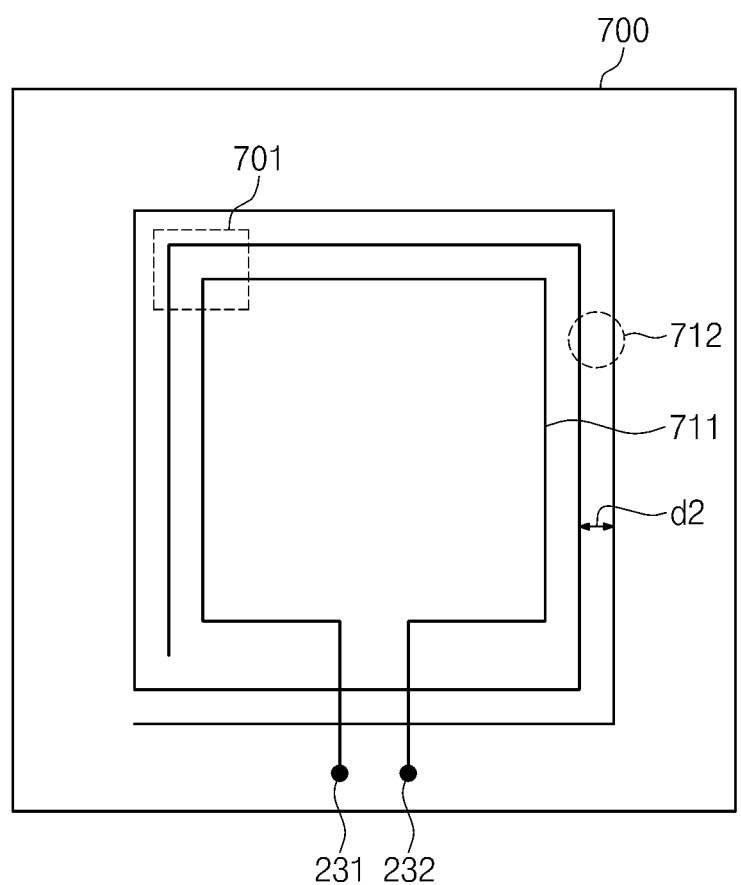
FIGS. 3 to 6 are diagrams illustrating a source coil and a resonant coil according to at least one example embodiment of the inventive concepts.

Referring to FIG. 3, a first conductive line 711 and a second conductive line 712 are formed on a film 700. The first conductive line 711 is formed to have a loop shape, and the second conductive line 712 is formed to have a spiral shape. The first conductive line 711 corresponds to a source coil SC, and the second conductive line 712 corresponds to a resonant coil RC. A width and a length of each of the first and second conductive lines 711 and 712 may be adjusted variously.

In at least one example embodiment, in the event that the source coil SC and the resonance coil RC shown in FIG. 3 are used in an NFC antenna matching network system 230 for POS (Point Of Sales) for a credit card payment, each of the first and second conductive lines 711 and 712 is about 0.5- to about 1.2-mm wide.

A length (or, the number of winding turns) of each of the first and second conductive lines 711 and 712 may be based on a desired inductance for a resonance frequency. A length of the second conductive line 711, for example, may have the number of winding turns suitable to form inductance of 4 µH to 9 µH. An area (hereinafter, referred to as a coil formation area or an antenna formation area) where the second conductive line 712 is formed may have an area of about 20 cm² to about 54 cm².

In at least one example embodiment, a capacitor being a lumped (or separate) element may be connected between both ends of the second conductive line 712 corresponding to a resonant coil Lr10. Also, both ends of the second conductive line 712 corresponding to a resonant coil Lr10 may be electrically connected. In the event that both ends of the second conductive line 712 corresponding to a resonant coil Lr10 are electrically connected, a capacitor forming a parallel resonance circuit with the resonant coil Lr10 may be a parasitic capacitance.

FIG. 3 illustrates an example in which the first conductive line 711 and the second conductive line 712 are together formed on one of a top surface and a bottom surface of the film 700. However, the first conductive line 711 may formed on one of the top surface and the bottom surface of the film 700, and the second conductive line 712 may formed on the other of the top surface and the bottom surface of the film 700. For example, referring to FIG. 4, the first conductive line 711 is formed on the top surface of the film 700, and the second conductive line 712 is formed on the bottom surface of the film 700. Alternatively, the first conductive line 711 may be formed on the bottom surface of the film 700, and the second conductive line 712 may be formed on the top surface of the film 700. A width and a length of each of the first and second conductive lines 711 and 712 may be changed as desired. The first conductive line 711 is formed to have a loop shape, and the second conductive line 712 is formed to have a spiral shape.

Figure 4:
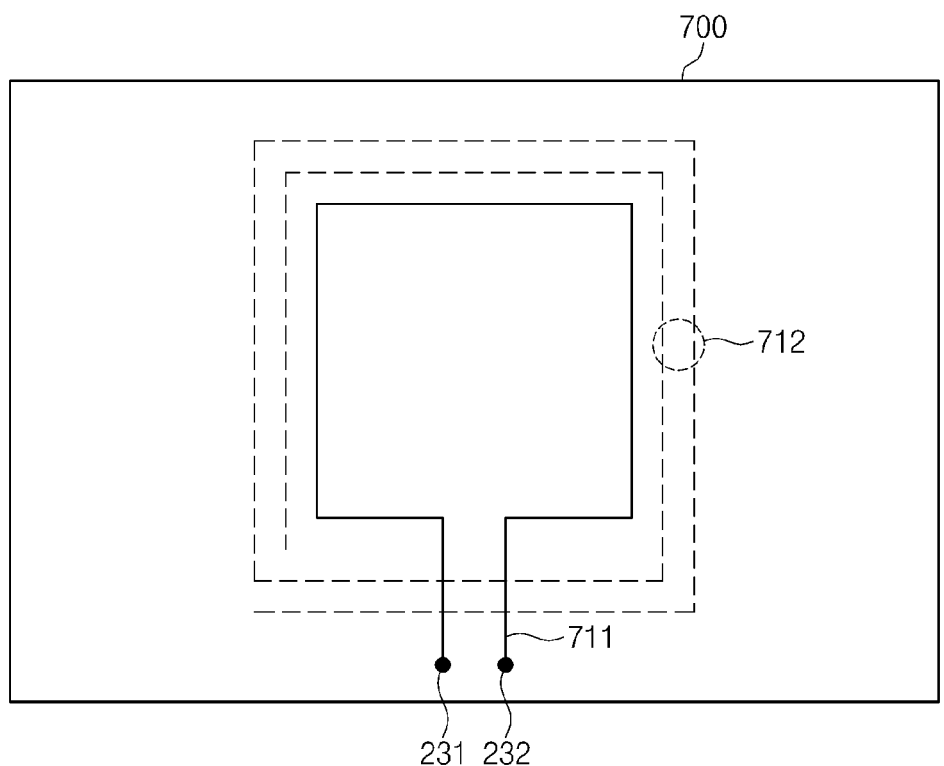
Figure 5:
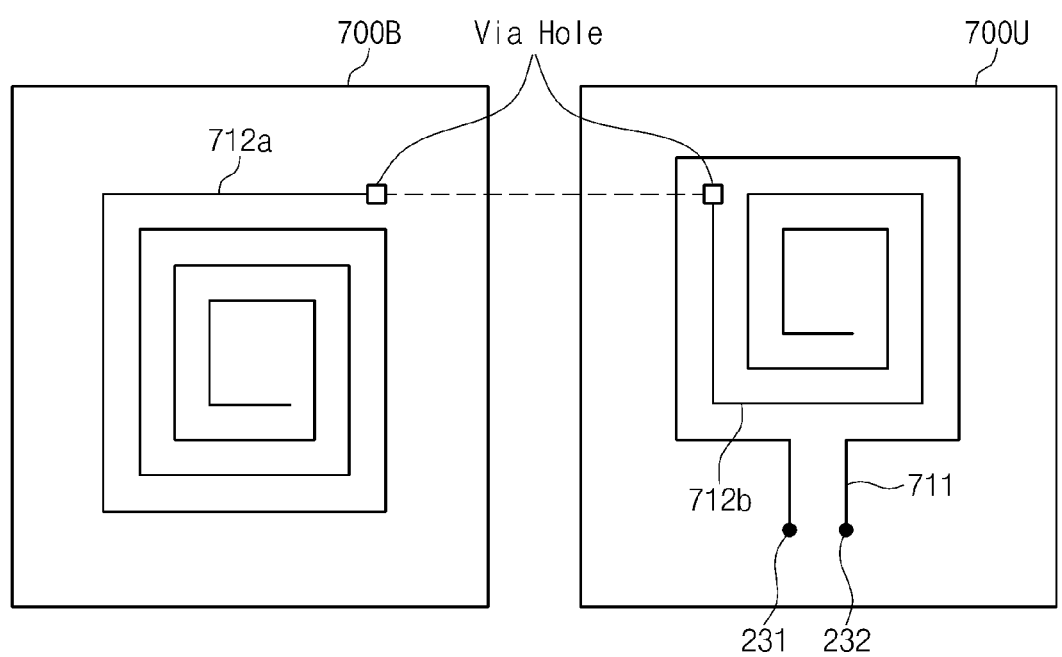

In FIGS. 3 and 4, there is illustrated an example in which the second conductive line 712 is formed of one conductive line. However, the second conductive line 712 may be formed of at least two conductive lines. Referring to FIG. 5, for example, a conductive line 712a is formed on a bottom surface 700B of the film 700, and a conductive line 712b is formed on a top surface 700U of the film 700. In this case, the conductive lines 712a and 712b corresponding to a resonant coil Lr10 are electrically connected through a via hole penetrating the film 700. The first conductive line 711 is formed to have a loop shape, and each of the conductive lines 712a and 712b corresponding to the resonant coil Lr10 is formed to have a spiral shape.

In at least one example embodiment, one end of the conductive line 712a and one end of the conductive line 712b are directly connected. Or, one end of the conductive line 712a and one end of the conductive line 712b are electrically connected with a capacitor being a lumped (or separate) element interposed between the one end of the conductive line 712a and one end of the conductive line 712b.

Figure 6:
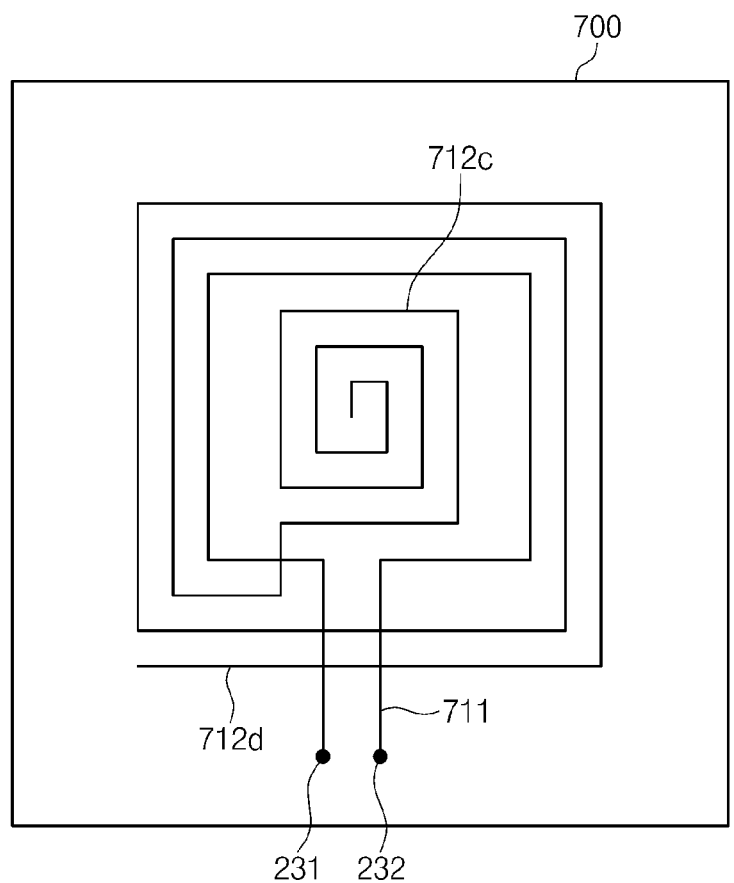

In FIG. 5, there is illustrated an example in which one of two conductive lines forming the second conductive line 712 is formed on a top or bottom surface of the film 700 and the other thereof is formed on a bottom or top surface of the film 700. However, two conductive lines forming the second conductive line 712 may be formed on one of the top surface and the bottom surface of the film 700. Referring to FIG. 6, for example, two conductive lines 712c and 712d forming the second conductive line 712 are formed on a top/bottom surface of the film 700 on which the first conductive line 711 corresponding to the source coil Lc10 is formed. In this case, one of the two conductive lines 712c and 712d forming the second conductive line 712 is formed within an inner space defined by the first conductive line 711, and the other thereof is formed outside the first conductive line 711. The first conductive line 711 is formed to have a loop shape, and each of the conductive lines 712c and 712d corresponding to the resonant coil Lr10 is formed to have a spiral shape. One end of each of the conductive lines 712c and 712d may be electrically connected to each other, and the other end of each of the conductive lines 712c and 712d may be electrically connected with a capacitor being a lumped (or separate) element interposed in between these ends.

FIG. 6 illustrates an example where one square pattern is formed within an inner space defined by the first conductive line 711. However, it should be understood that the number of square patterns formed within an inner space defined by the first conductive line 711 is not limited to this disclosure. For example, two or more square patterns may be formed within an inner space defined by the first conductive line 711.

FIGS. 3 to 6 illustrate examples where a resonance coil is formed to have a quadrangle. However, the inventive concepts are not limited thereto. For example, the resonance coil is formed to have a circle. An interval among winding turns of the resonance coil is regular or irregular.

Figure 7:
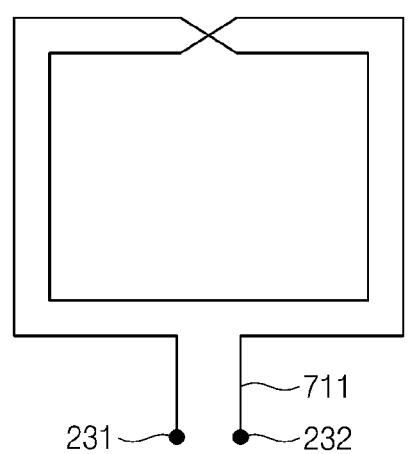
FIG. 7 is a diagram illustrating a source coil according to at least one example embodiment of the inventive concepts.

FIG. 7 is a diagram illustrating a source coil according to at least one example embodiment of the inventive concepts.

FIGS. 3 to 6 illustrate examples in which a source coil is a single-loop coil. However, a source coil Ls10 may be a multi-loop coil. As illustrated in FIG. 7, for example, a first conductive line 711 corresponding to the source coil Ls10 is formed to have two loops connected in series. It should be understood that the number of loops of the first conductive line 711 is not limited to this disclosure. Source coils Ls10 illustrated in FIGS. 3 to 6 may be replaced with the source coil Ls10 illustrated in FIG. 7.

In at least one example embodiment, an antenna structure according to the inventive concepts is applicable to asymmetric and symmetric structures.

In at least one example embodiment, if a source coil and a resonant coil are placed to be adjacent to each other, locations of the source coil and the resonant coil may not be limited. For example, the source coil may be formed on a battery, and the resonant coil may be formed on a case of a mobile device (or, a battery cover) adjacent to the battery.

Shapes of source and resonance coils shown in FIGS. 3 to 7 are described based on a first NFC antenna 230A1 shown in FIG. 2. Like the first NFC antenna 230A1, second and third NFC antennas 230A2 and 230A3 may be implemented to have shapes of source and resonance coils described with reference to FIGS. 3 to 7. Although shapes of the source and resonance coils may be equal to each other, antenna formation areas (or, coil formation areas), that is, areas where the source and resonance coils are formed may have different sizes. In other words, the size of the first NFC antenna 230A1, the size of the second NFC antenna 230A2, and the size of the third NFC antenna 230A3 may be different from one another.

FIGS. 8A to 8F are diagrams schematically illustrating NFC antenna matching network systems according to at least one example embodiment of the inventive concepts.

Figure 8A:
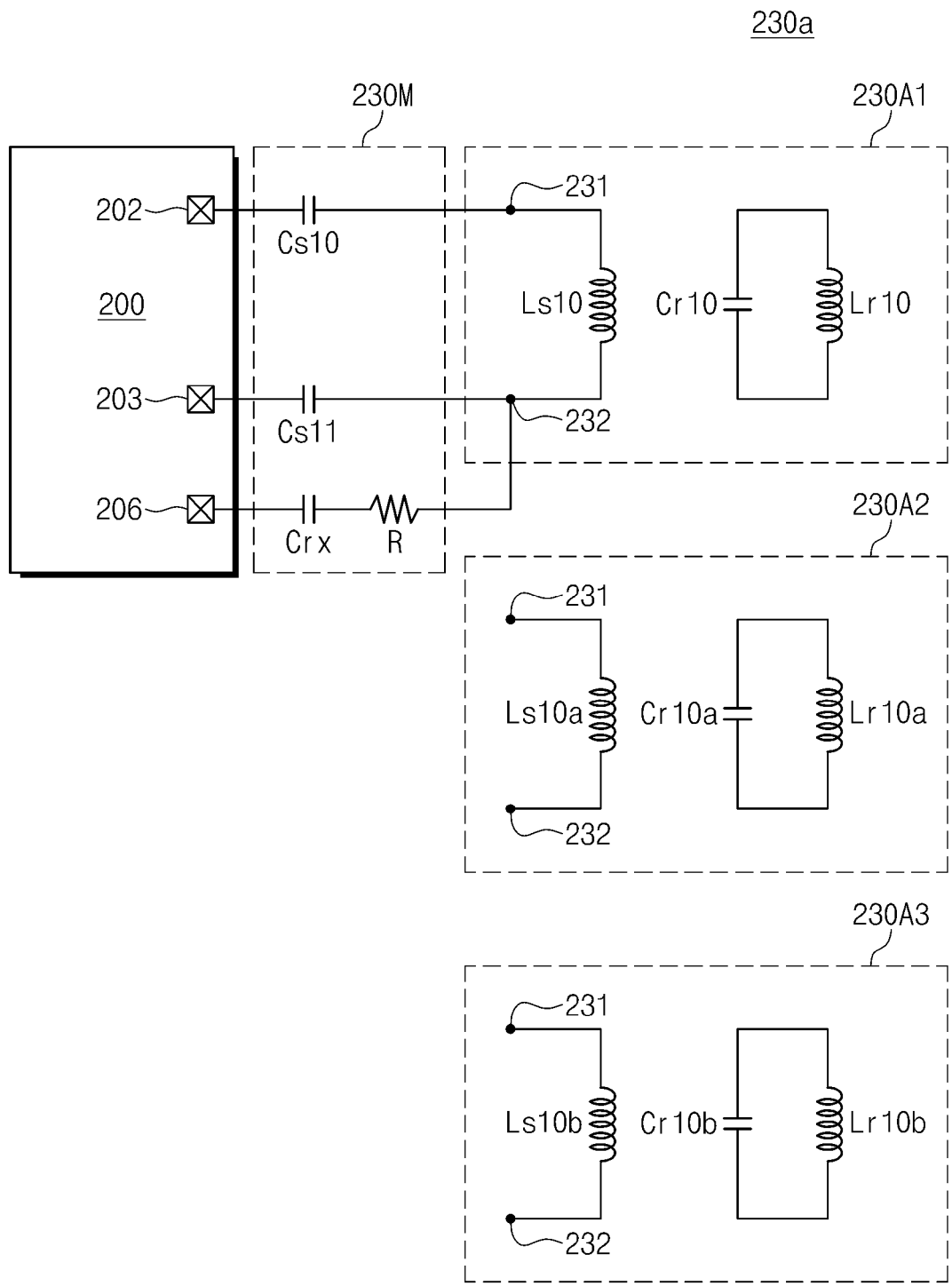
FIGS. 8A to 8F are diagrams schematically illustrating NFC antenna matching network systems according to at least one example embodiment of the inventive concepts.

Referring to FIG. 8A, an NFC antenna matching network system 230a includes a matching circuit 230M and first to third NFC antennas 230A1 to 230A3. The matching circuit 230M and the first to third NFC antennas 230A1 to 230A3 are substantially the same as that those shown in FIG. 2 except a capacitor Crx and a resistor R are connected in series between an antenna terminal 232 and a chip terminal 206, and a description thereof is thus omitted. The capacitor Crx and resistor R may function as a passive filter for the matching circuit 230M.

Figure 8B:
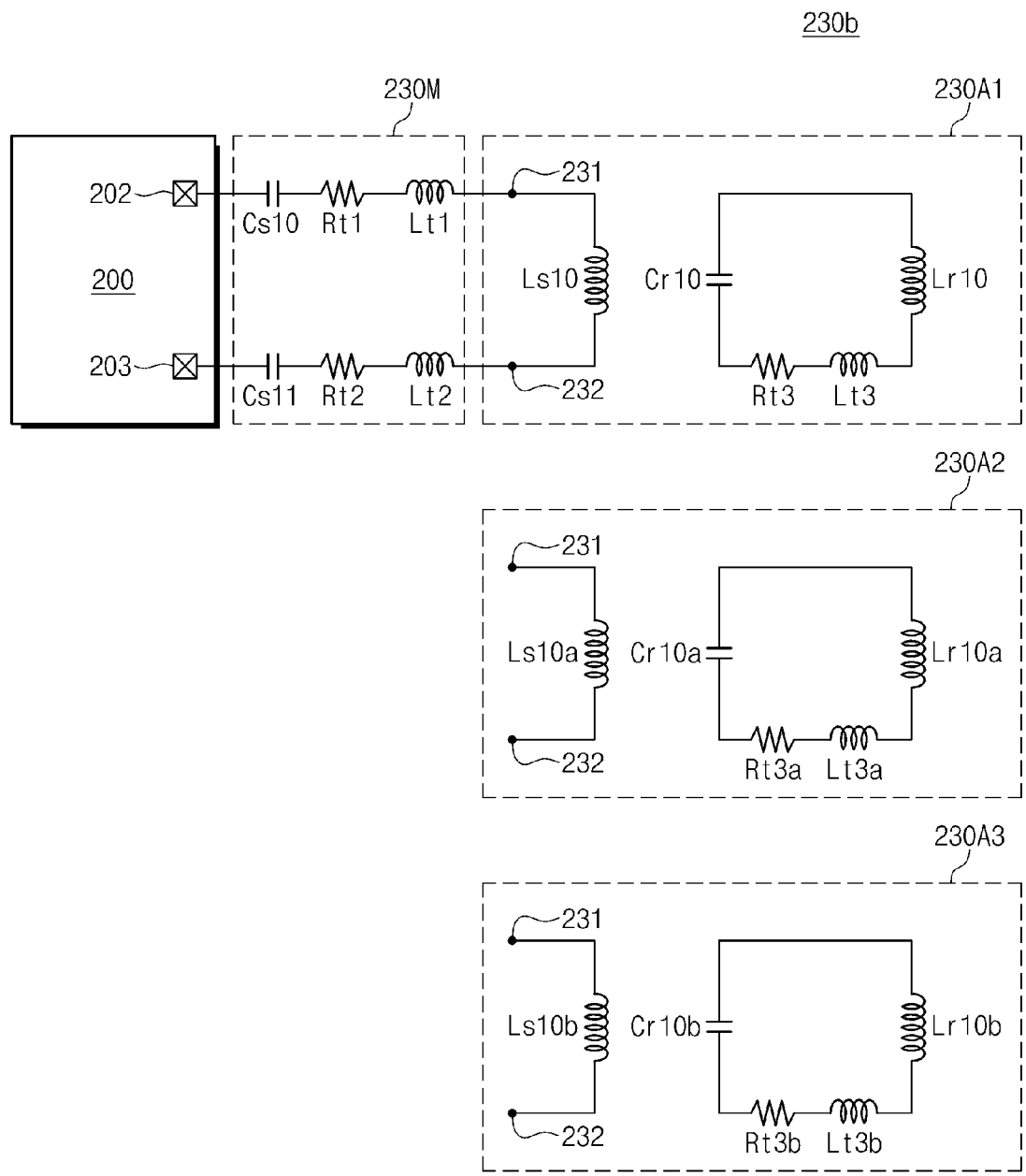

As illustrated in FIG. 8B, a resistor Rt1 and the inductor Lt1 are connected in series between an antenna terminal 231 and a capacitor Cs10, and a resistor Rt2 and the inductor Lt2 are connected in series between an antenna terminal 232 and a capacitor Cs11. Herein, the resistors Rt1 and Rt2 and the inductors Lt1 and Lt2 may be used to tune impedance matching, a bandwidth, a Q value (or Q factor), etc. In some cases, the resistors Rt1 and Rt2 may be removed. For example, the resistors Rt1 and Rt2 or the inductors Lt1 and Lt2 may be used to tune impedance matching, a bandwidth, or a Q value.

Also, the resistor Rt3 and the inductor Lt3 are connected in series between the inductor Lr10 as a resonant coil and the capacitor Cr10. As described above, the resistor Rt3 or the inductor Lt3 may be used to tune impedance matching, a bandwidth, or a Q value. A combination of resistors and inductors may be made variously to tune impedance matching, a bandwidth, or a Q value. Likewise, a resistor Rt3a and an inductor Lt3a of the second NFC antenna 230A2 are connected in series between an inductor Lr10a as a resonant coil and a capacitor Cr10a, and a resistor Rt3b and an inductor Lt3b of the third NFC antenna 230A3 are connected in series between an inductor Lr10b as a resonant coil and a capacitor Cr10b.

Although not shown, it should be understood that resistors and/or inductors used to tune impedance matching, a bandwidth, or a Q value are applicable to the NFC antenna matching network system illustrated in FIG. 2.

Figure 8C:
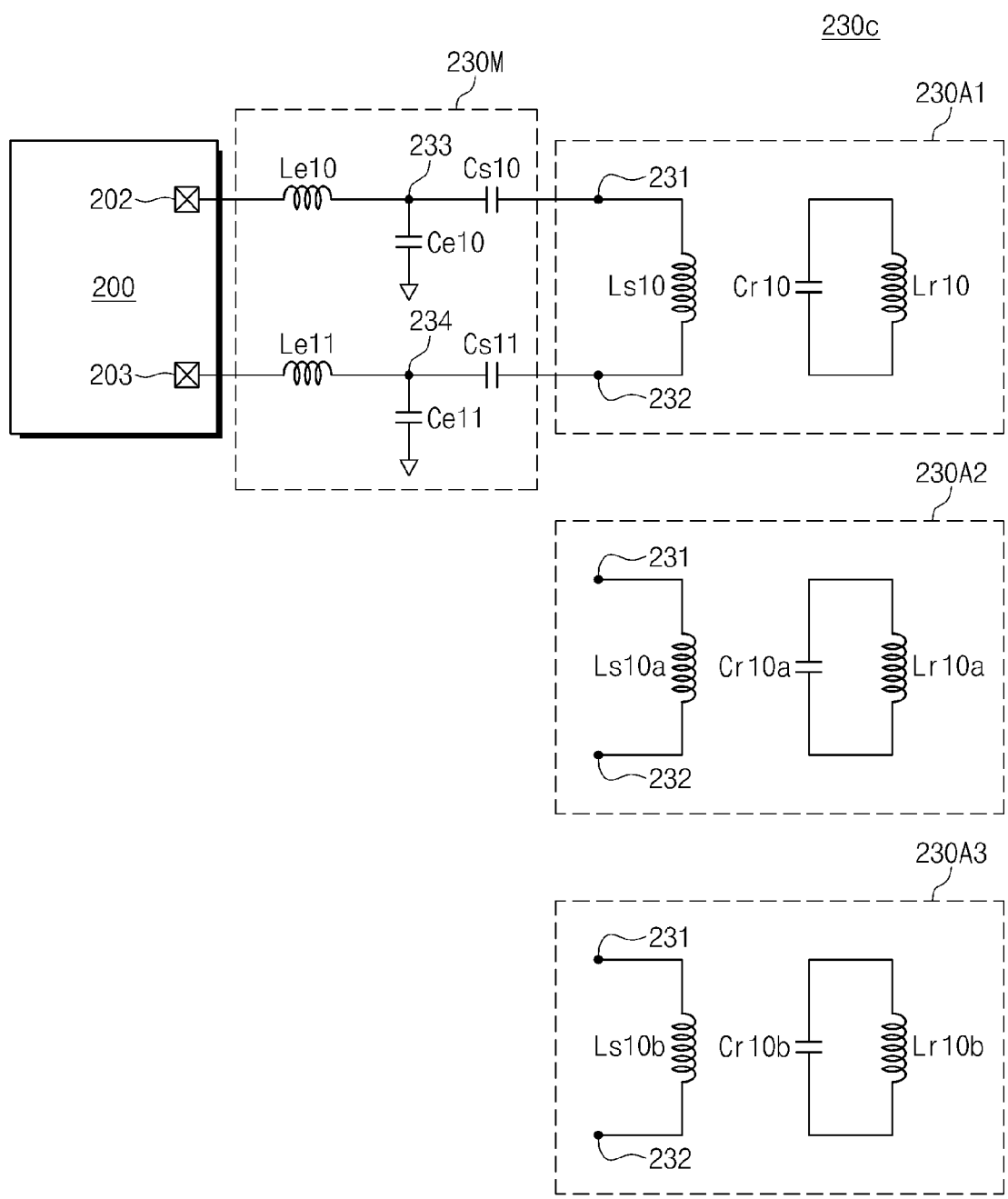

Referring to FIG. 8C, an NFC antenna matching network system 230c according at least one example embodiment of inventive concepts may include capacitors Ce10, Ce11, Cs10, Cs11, and Cr10 and inductors Le10, Le11, Ls10, and Lr10. The NFC antenna matching network system 230c is electrically connected with chip terminals 202 and 203 of an NFC transceiver 200.

The inductors Le10 and Le11 and the capacitors Ce10 and Ce11 may constitute a filter (e.g., an EMC filter) for removing a harmonic wave of an NFC signal output from the NFC transceiver 200. The inductor Le10 and the capacitor Cs10 are connected between the chip terminal 202 and an antenna node 231, and the capacitor Ce10 is connected between a connection node 233 between the inductor Le10 and the capacitor Cs10 and a reference potential (e.g., a ground voltage). The inductor Le11 and the capacitor Cs11 are connected between the chip terminal 203 and an antenna node 232, and the capacitor Ce11 is connected between a connection node 234 between the inductor Le11 and the capacitor Cs11 and a reference potential (e.g., a ground voltage).

The inductor Ls10 and the capacitors Cs10 and Cs11 may constitute a serial resonator. In at least one example embodiment, the inductor Ls10 may be referred to as a source coil. The capacitor Cr10 and the inductor Lr10 may constitute a parallel resonator. As illustrated in FIG. 8C, the parallel resonator formed of the capacitor Cr10 and the inductor Lr10 is physically separated (or spaced apart from) from the serial resonator that is electrically connected with the chip terminals 202 and 203. In at least one example embodiment, the inductor Lr10 may be referred to as a resonant coil. The source coil Lr10 is physically separated (or spaced apart) from the resonant coil Ls10. In other words, the resonant coil Lr10 is electrically floated (or electrically isolated) from the source coil Ls10. The source coil Ls10 is supplied with a power from the NFC transceiver 200, and the resonant coil Lr10 is supplied with a power from the source coil Ls10 by magnetic induction. The resonant coil Lr10 may transmit or receive NFC signals by parallel resonance.

Since the NFC antenna matching network system 230d according to at least one example embodiment of the inventive concepts transmits and receives NFC signals under a condition where a serial resonator suitable for a transmission mode (i.e., advantageous to form a magnetic field) and a parallel resonator suitable for a reception mode (i.e., advantageous to be supplied with a power) are physically separated (or spaced apart), the serial resonator and the parallel resonator do not influence each other in terms of impedance. Since the resonant coil Lr10 is floated (or electrically isolated), impedance seen from the resonant coil Lr10 may become low. Thus, a quality (Q) factor may become high, and the amount of current induced at the resonant coil Lr10 (or, the strength of a magnetic field) may increase. Also, as the amount of current induced or the strength of a magnetic field increases, a recognition distance or a reception voltage may increase.

Also, as an impedance of a reader mode of a serial resonance becomes low, reception of a high current is possible. As an impedance of a reader mode of a parallel resonance become high, a high voltage is induced. The increase in a magnetic field enables possible antenna locations to increase. Therefore, performance of a small-sized antenna may be improved. That is, the effects of the formation of a magnetic field in a reader mode and a transmission/reception voltage in a card mode may be reduced (or alternatively, eliminated). Since the amount of current flowing through Lr10 (or, the strength of a magnetic field) increases, a recognition distance or a reception voltage may be increased compared with a typical NFC antenna matching network system. Thus, it is possible to satisfy the EMV power specification using an NFC antenna that is formed in a less area (e.g., about 20 cm$^2$). Accordingly, an NFC antenna matching network system of the inventive concepts does not use an external amplifier.

The second and third NFC antennas 230A2 and 230A3 obtain the same effect as the first NFC antenna 230A1.

Figure 8D:
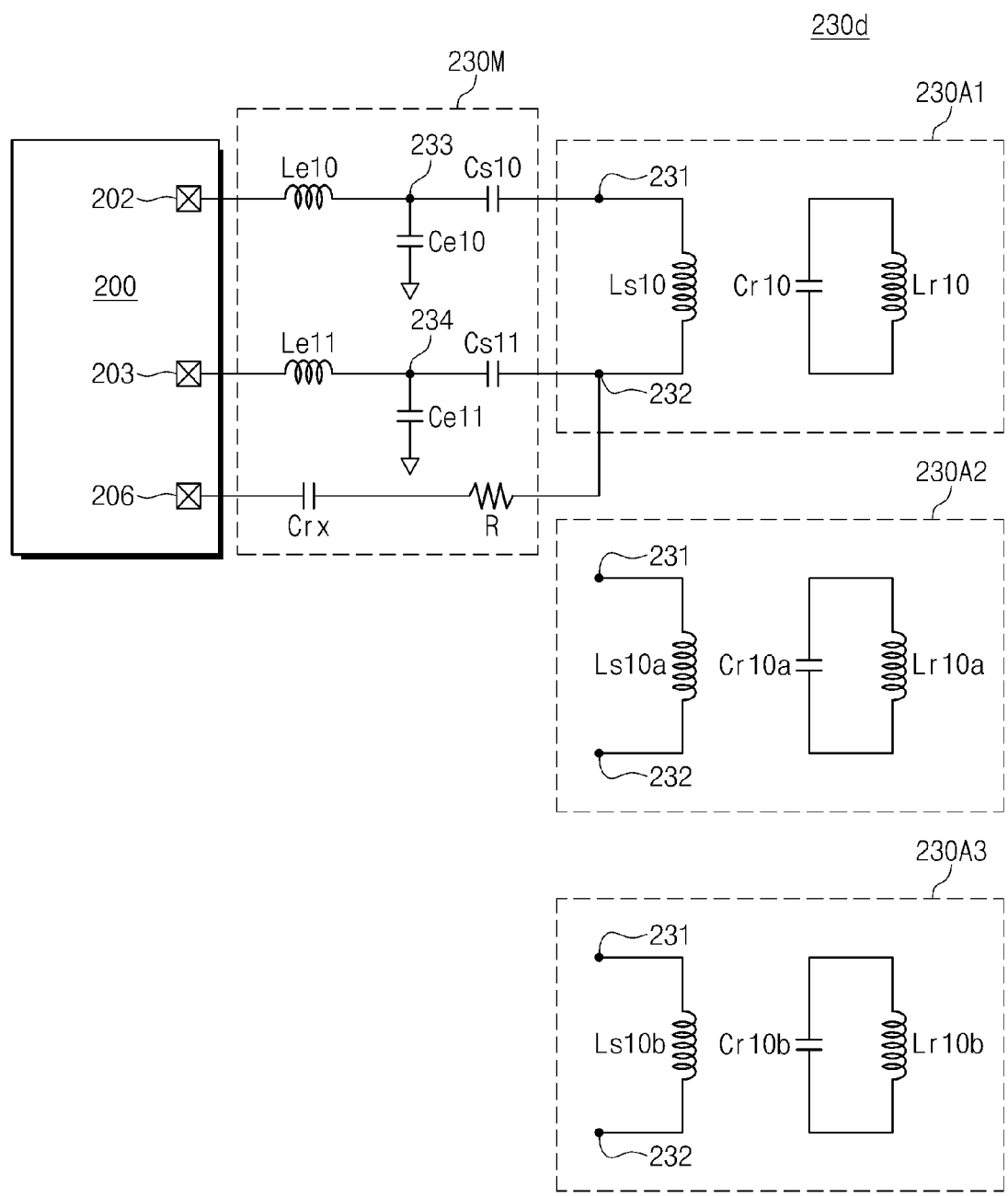

Referring to FIG. 8D, an NFC antenna matching network system 230d includes a matching circuit 230M and first to third NFC antennas 230A1 to 230A3. The matching circuit 230M and the first to third NFC antennas 230A1 to 230A3 are substantially the same as that those shown in FIG. 8C except a capacitor Crx10 and a resistor R10 are connected in series between an antenna terminal 232 and a chip terminal 206, and a description thereof is thus omitted. The capacitor Crx10 and resistor R10 may function as a passive filter for the matching circuit 230M.

Figure 8E:
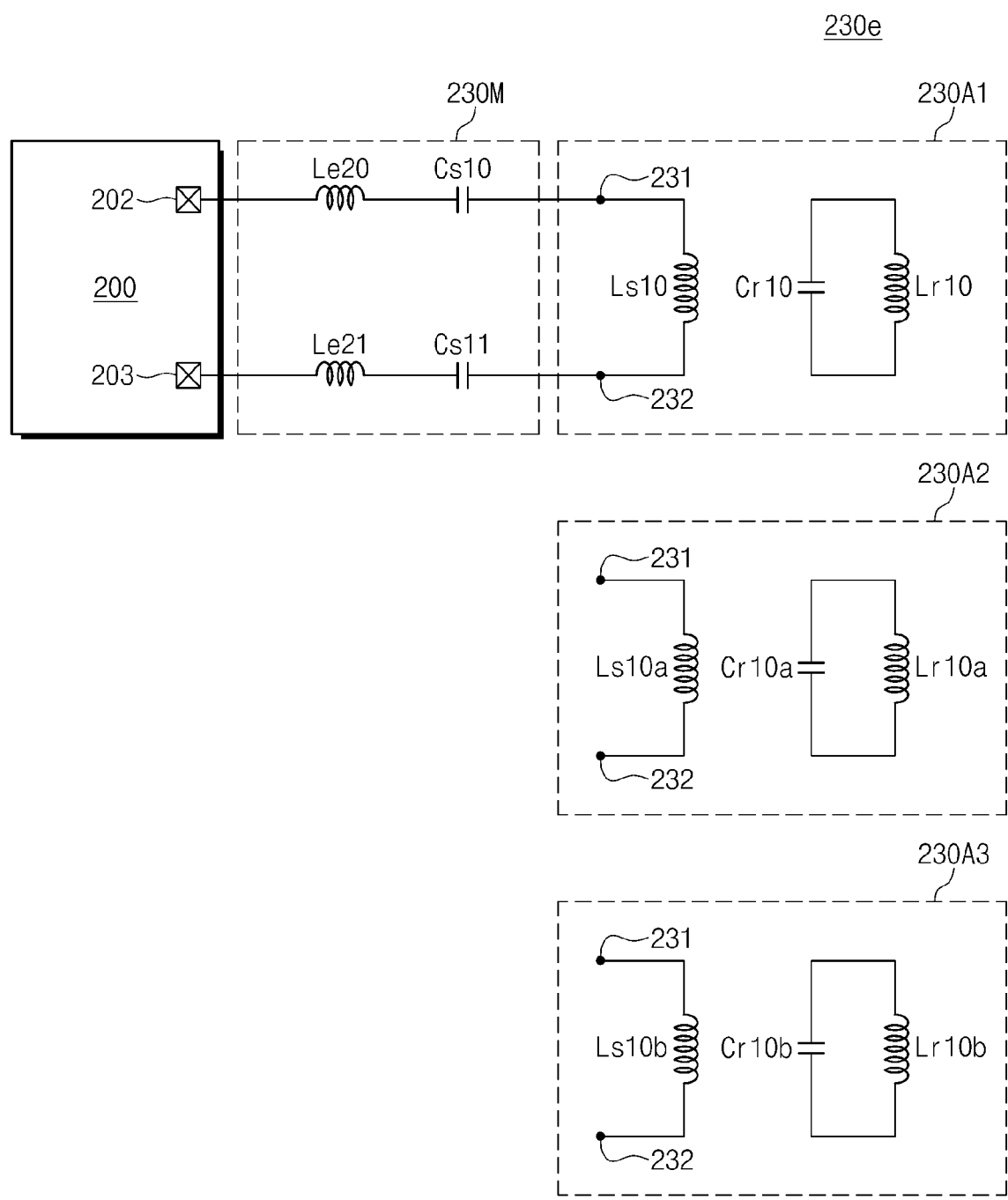

Referring to FIG. 8E, an NFC antenna matching network system 230e includes capacitors Ce10, Ce11, and Cr10 and inductors Le10, Le20, Le21, Ls10, and Lr10. The NFC antenna matching network system 230e is electrically connected to chip terminals 202 and 203 of an NFC transceiver 200.

The inductor Le20 and the capacitor Cs10 are connected in series between the chip terminal 202 and an antenna node 203, and the inductor Le21 and the capacitor Cs11 are connected in series between the chip terminal 203 and an antenna node 232. The inductors Le20 and Le21 may contribute to the impedance matching function of the matching circuit 230M. In at least one example embodiment, the inductor Ls10 may be referred to as a source coil. The capacitor Cr10 and the inductor Lr10 may form a parallel resonator. As illustrated in FIG. 8E, the parallel resonator formed of the capacitor Cr10 and the inductor Lr10 may be physically separated (or spaced apart) from the serial resonator that is electrically connected with the chip terminals 202 and 203. In at least one example embodiment, the inductor Lr10 may be referred to as a resonant coil. The source coil Ls10 is physically separated (or spaced apart) from the resonant coil Lr10. In other words, the resonant coil Lr10 is electrically floated (or electrically isolated) from the source coil Ls10. The source coil Ls10 may be supplied with a power from a reader of the NFC transceiver 200, and the resonant coil Lr10 may be supplied with a power from the source coil Ls10 by magnetic induction. The resonant coil Lr10 transmits or receives NFC signals by parallel resonance.

The NFC antenna matching network system 230e according to at least one example embodiment of the inventive concepts may transmit and receive NFC signals under a condition where a serial resonator suitable for a transmission mode (i.e., advantageous to form a magnetic field) and a parallel resonator suitable for a reception mode (i.e., advantageous to be supplied with a power) are physically separated (or spaced apart). In this case, the serial resonator and the parallel resonator have reduced influence on each other in terms of impedance. That is, impedance seen from the resonant coil Lr10 becomes low because the resonant coil Lr10 is floated (or electrically isolated). Thus, a quality factor increases, and the amount of current (or, the strength of a magnetic field) induced at the resonant coil Lr10 increases. As the amount of current induced or the strength of a magnetic field increases, also, a recognition distance or a reception voltage may increase.

Also, as an impedance of a reader mode of a serial resonance becomes low, reception of a high current is possible. As an impedance of a reader mode of a parallel resonance become high, a high voltage is induced. The increase in a magnetic field enables a number of possible antenna locations to increase. Therefore, performance of a small-sized antenna may be improved. That is, the effects of the formation of a magnetic field in a reader mode and a transmission/reception voltage in a card mode may be reduced (or alternatively, eliminated). Since the amount of current flowing through Lr10 (or, the strength of a magnetic field) increases, a recognition distance or a reception voltage increases compared with a typical NFC antenna matching network system. Thus, it is possible to satisfy the EMV power specification using an NFC antenna that is formed in less area (e.g., about 20 cm$^2$). This means that the NFC antenna matching network system of the inventive concept does not necessitate an external amplifier.

The second and third NFC antennas 230A2 and 230A3 obtain the same effect as the first NFC antenna 230A1.

Figure 8F:
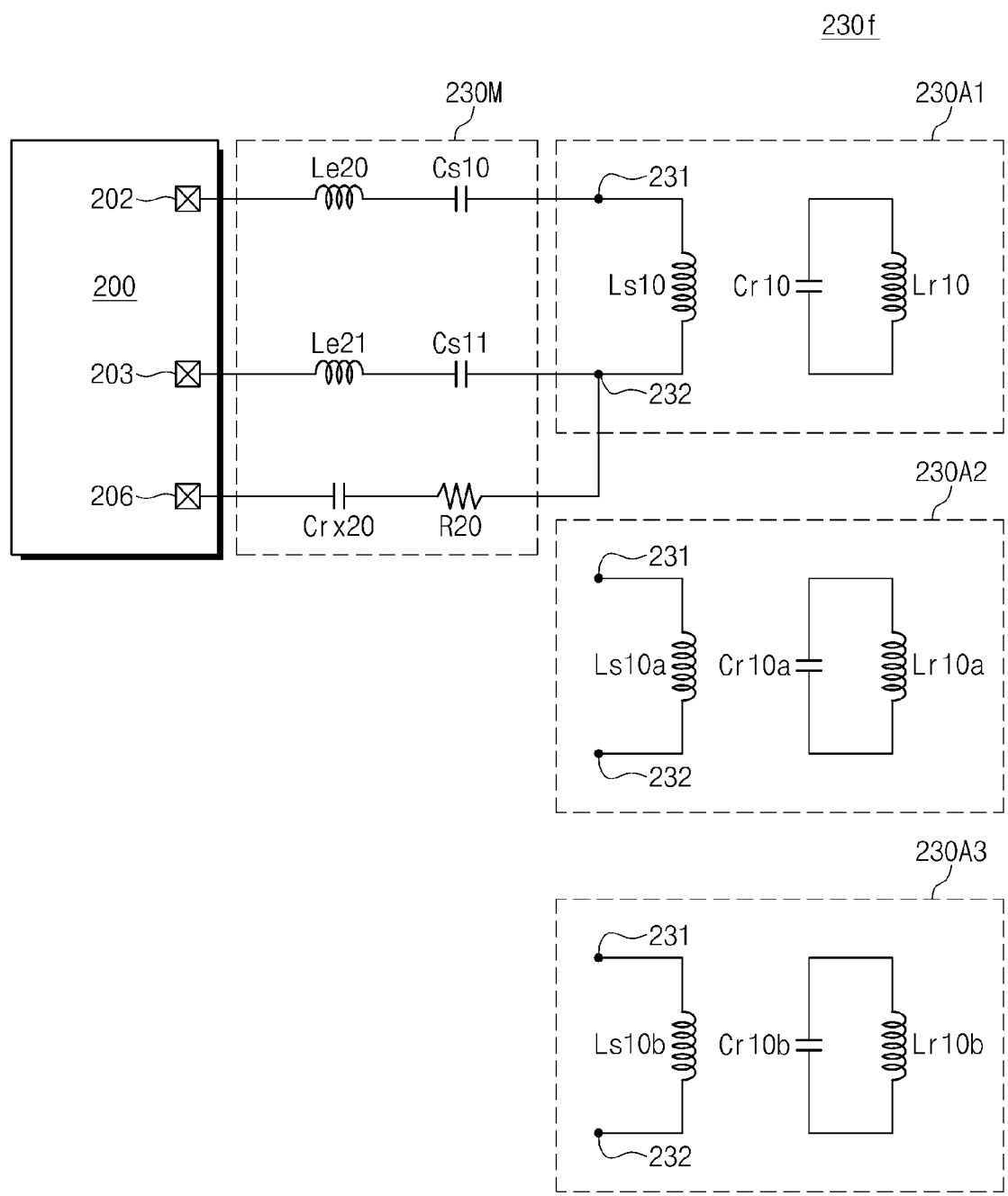

Referring to FIG. 8F, an NFC antenna matching network system 230f includes a matching circuit 230M and first to third NFC antennas 230A1 to 230A3. The matching circuit 230M and the first to third NFC antennas 230A1 to 230A3 are substantially the same as that those shown in FIG. 8E except a capacitor Crx20 and a resistor R20 are connected in series between an antenna terminal 232 and a chip terminal 206, and a description thereof is thus omitted. The capacitor Crx20 and resistor R20 may function as a passive filter for the matching circuit 230M.

In FIGS. 8A to 8F, a capacitor may be selectively connected between antenna terminals 231 and 232. Also, as described with reference to FIG. 8B, a parallel resonator is implemented such that a resistor and/or an inductor is selectively inserted between a capacitor and a resonance coil. Likewise, a resistor and/or an inductor is selectively inserted between a source coil Ls10 and a capacitor Cs10.

Figure 9:
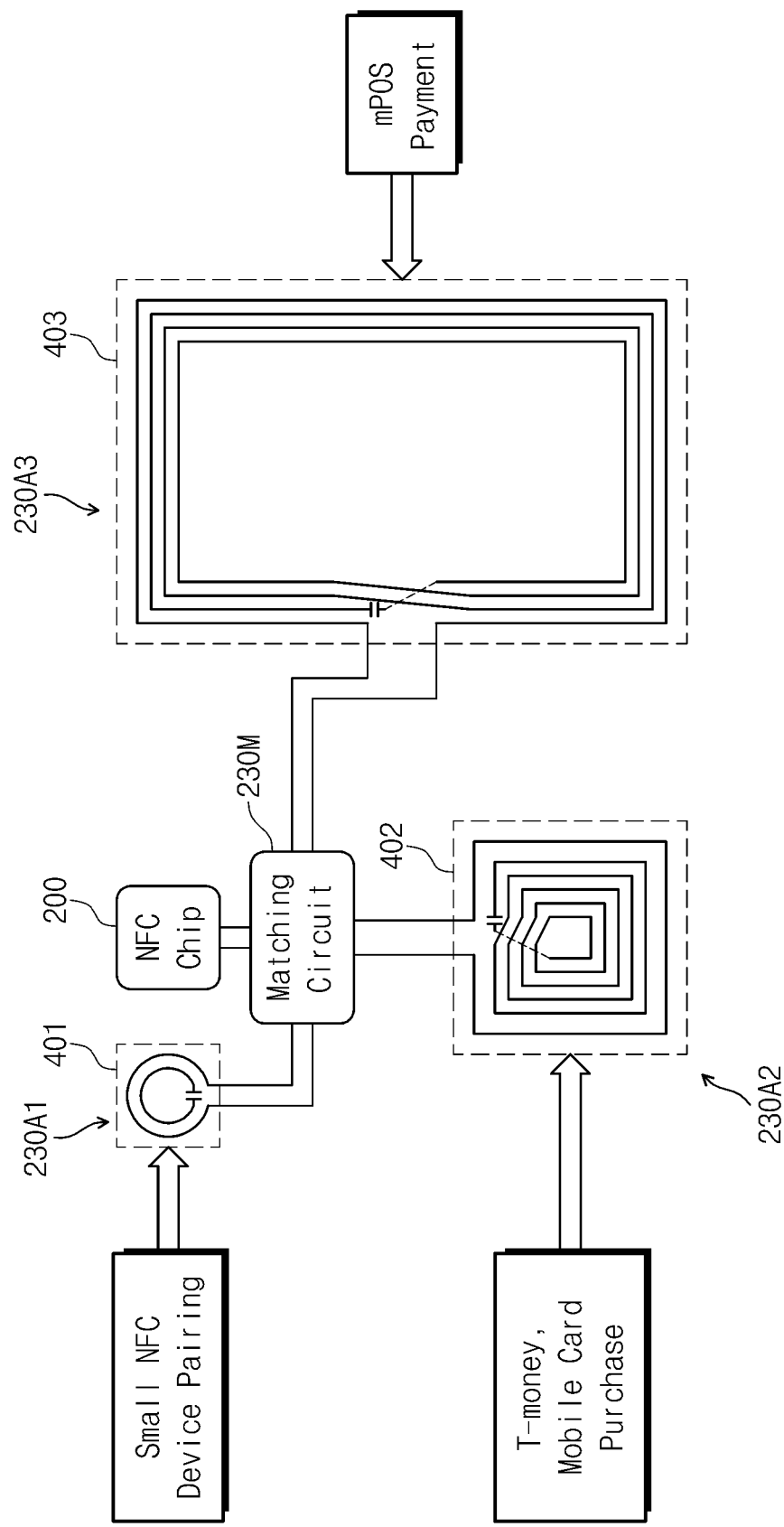
FIG. 9 is a diagram schematically illustrating a user device including an NFC antenna network system at least one example embodiment of the inventive concepts.

FIG. 9 is a diagram schematically illustrating a user device including an NFC antenna network system 230 of the inventive concepts.

Referring to FIG. 9, a user device, for example, includes an NFC chip 200, a matching circuit 230M, and first to third NFC antennas 230A1 to 230A3. Each of the first to third NFC antennas 230A1 to 230A3, as described with reference to FIGS. 3 to 7, is formed of a source coil having a loop shape and a resonance coil having a spiral shape. As shown in FIG. 9, an antenna area 401 where the first NFC antenna 230A1 is formed, an antenna area 402 where the second NFC antenna 230A2 is formed, and an antenna area 403 where the third NFC antenna 230A3 is formed are disposed at different locations (e.g., a battery pack, a flip cover, and the like) of the user device. As also shown in FIG. 9, the sizes of the antenna areas 401 to 403 are different from one another. For example, the first NFC antenna 230A1 is used for pairing of a small-size NFC device, the second NFC antenna 230A2 is used for purchase of T-money, mobile card, etc., and the third NFC antenna 230A3 is used for payment of a mobile POS (Point Of Sales). However, it should be understood that uses of the first to third NFC antennas 230A1 to 230A3 are not limited to this disclosure.

In a typical NFC antenna matching network system, capacitors for serial resonance and capacitors for parallel resonance may be electrically connected with an antenna. In this case, the capacitors for serial resonance may be affected by the capacitors for parallel resonance in terms of impedance, or the capacitors for parallel resonance may be affected by the capacitors for serial resonance in terms of impedance. This influence may lower a transfer performance (or, a quality factor) of the typical NFC antenna matching network system. In particular, in a POS system for credit card payment, an antenna with the size of 56 cm² (8 cm×7 cm) or more is desired to satisfy the EMV power specification. An antenna with a minimum size of about 20 cm² (4 cm×5 cm) is desired to satisfy the EMV power specification where a z-axis distance is about 2 cm in a device pair application. However, the high impedance of the typical NFC antenna matching network system may limit the system when a magnetic field is generated in a reader mode. Thus, for a mobile device to use an antenna that has a size to satisfy the above-described specifications, the typical NFC antenna matching network system uses an external amplifier the area where an antenna is formed is limited. Since a reader mode and a card mode are performed using the same antenna and matching network, trade-offs occur between formation of a magnetic field in a reader mode and a transmission/reception voltage in a card mode.

In contrast, the NFC antenna matching network system 230 according to at least one example embodiment of the inventive concepts may transmit and receive NFC signals under a condition where a serial resonator suitable for a transmission mode (i.e., advantageous to form a magnetic field) and a parallel resonator suitable for a reception mode (i.e., advantageous to be supplied with a power) are physically separated (or spaced apart). In this case, the serial resonator and the parallel resonator do not influenced each other in terms of impedance. Compared with a typical NFC antenna matching network system, impedance experienced by the resonant coil Lr10 may be low because the resonant coil Lr10 is floated (or electrically isolated). Thus, impedance of the source coil Lr10 is reduced. As this impedance is reduced, the amount of current flowing via the source coil Ls10 may increase relatively. Thus, the amount of current induced at the resonant coil Lr10 (or, the strength of a magnetic field) increases. As the amount of current induced or the strength of a magnetic field increases, a recognition distance or a reception voltage may increase.

In this case, as impedance of a reader mode of a serial resonance becomes low, reception of a high current is possible. As impedance of a reader mode of a parallel resonance becomes high, a high voltage is induced. The increase in a magnetic field enables a number of antenna locations to increase. Therefore, performance of a small-sized antenna may be improved. That is, the effects of the formation of a magnetic field in a reader mode and a transmission/reception voltage in a card mode may be reduced (or alternatively, eliminated). Since the amount of current flowing through Lr10 (or, the strength of a magnetic field) increases, a recognition distance or a reception voltage increases compared with a typical NFC antenna matching network system. Thus, it is possible to satisfy the EMV power specification using an NFC antenna that is formed in less area (e.g., about 20 cm²). This means that the NFC antenna matching network system does not use an external amplifier.

Figure 10:
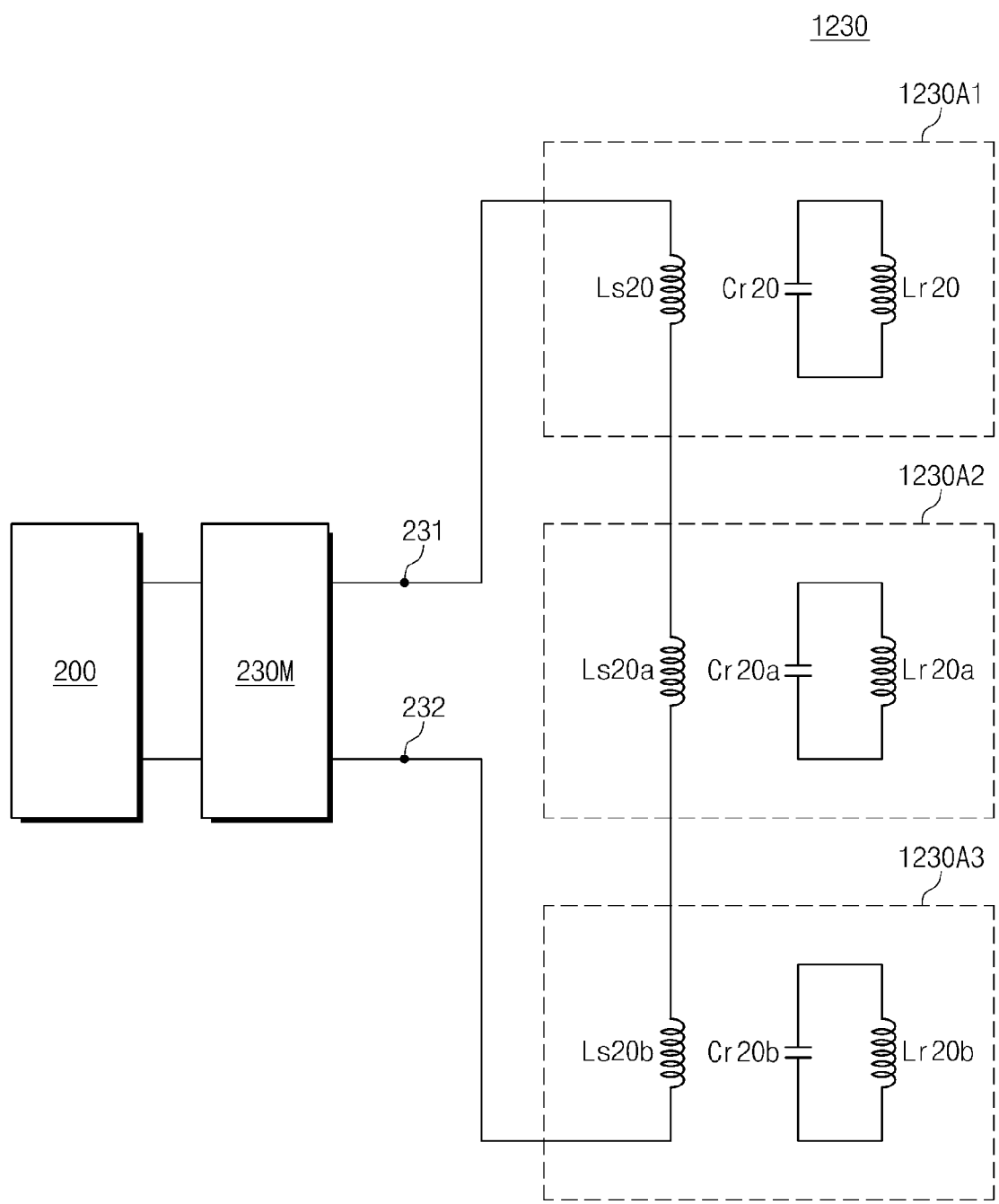
FIG. 10 is a block diagram schematically illustrating an NFC antenna matching network system shown in FIG. 1, according to at least one example embodiment of the inventive concepts.

FIG. 10 is a block diagram schematically illustrating an NFC antenna matching network system shown in FIG. 1, according to at least one other example embodiment of the inventive concepts.

Referring to FIG. 10, an NFC antenna matching network system 1230 includes a matching circuit 230M connected to antenna terminals 231 and 232. The matching circuit 230M may be one of the matching circuits described with reference to FIGS. 2 and 8A to 8F. The NFC antenna matching network system 1230 further includes a first inductor Ls20, a second inductor Ls20a, and a third inductor Ls20b that are connected in series between the antenna terminals 231 and 232. Each of the first to third inductors Ls20 to Ls20b may act as a source coil. The NFC antenna matching network system 1230 further comprises first to third parallel resonators corresponding to the first to third inductors Ls20 to Ls20b. Each of the first to third parallel resonators is formed of a capacitor and an inductor. For example, the first parallel resonator includes a capacitor Cr20 and an inductor Lr20, the second parallel resonator includes a capacitor Cr20a and an inductor Lr20a, and the third parallel resonator includes a capacitor Cr20b and an inductor Lr20b. Each of the first to third parallel resonators is physically separated (or spaced apart) from a corresponding source coil.

Here, the source coil Ls20, the capacitor Cr20, and the inductor Lr20 form a first NFC antenna 1230A1, the source coil Ls20a, the capacitor Cr20a, and the inductor Lr20a form a second NFC antenna 1230A2, and the source coil Ls20b, the capacitor Cr20b, and the inductor Lr20b form a third NFC antenna 1230A3.

The NFC antenna matching network system 1230 shown in FIG. 10 is substantially the same as that described with reference to one of FIGS. 2 and 8A to 8F except that source coils are connected in series between the antenna terminals 231 and 232, and a description thereof is thus omitted.

Figure 11:
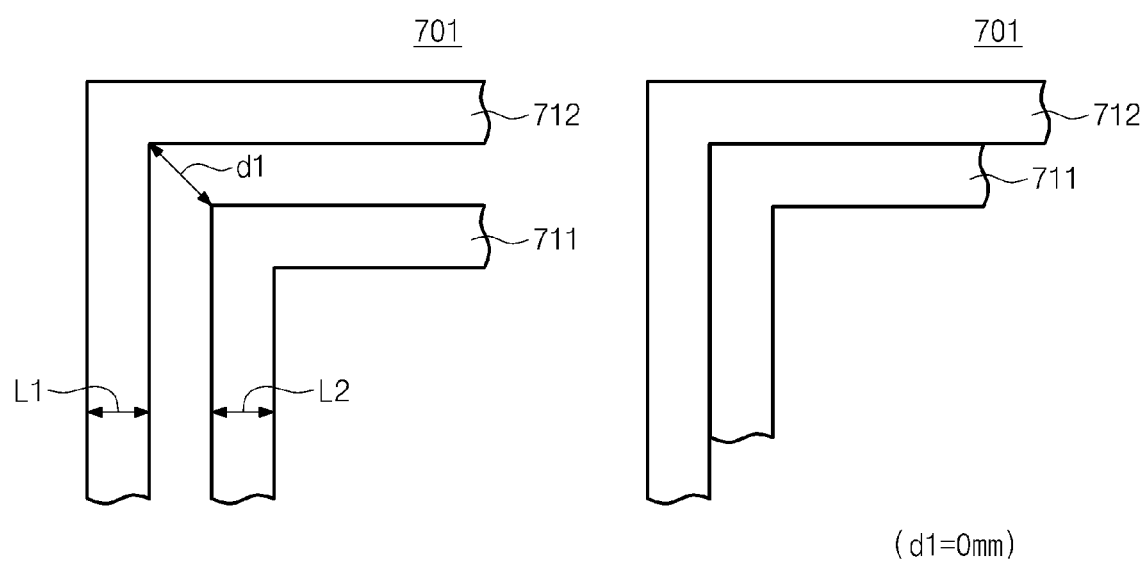
FIG. 11 is an expanded diagram of a dotted line shown in FIG. 3.

FIG. 11 is an expanded diagram of a dotted line 701 shown in FIG. 3.

In FIG. 11, there is illustrated an example where a second conductive line 712 corresponding to a resonance coil is formed outside a first conductive line 711 corresponding to a source coil. As described with reference to FIG. 6, the second conductive line 712 may be formed within an inner space defined by the first conductive line 711. A width L1 of the first conductive line 711 corresponding to the source coil and a width L2 of the second conductive line 712 corresponding to the resonance coil, for example, may be about 0.5 mm to about 1.2 mm. The width L1 of the first conductive line 711 may be equal to or different from the width L2 of the second conductive line 712. The number of winding turns of the second conductive line 712 maybe chosen such that the windings have an inductance of about 4 µH to about 9 µH. An interval d2 (refer to FIG. 3) between lines corresponding to adjacent winding turns of the resonance coil may be about 0.3 mm to about 0.6 mm.

In particular, a power output via an NFC antenna matching network system is based on inductive coupling between a source coil and a resonance coil. In other words, a maximum power is obtained when the inductive coupling between the source coil and the resonance coil is optimized. In at least one example embodiment, an interval d1 between the first conductive line 711 and the second conductive line 712 for obtaining the maximum power is within about 0 mm to about 1 mm. That is, an interval d1 between the outermost edge of a square pattern forming the first conductive line 711 and the innermost edge of a square pattern forming the second conductive line 712 is within about 0 mm to about 1 mm. If the interval d1 is about 0 mm, as illustrated at a right side of FIG. 11, then the outermost edge of a square pattern forming the first conductive line 711 and the innermost edge of a square pattern forming the second conductive line 712 are in contact. Also, if the interval d1 is within about 1 mm, as illustrated at a left side of FIG. 11, then the outermost edge of a square pattern forming the first conductive line 711 and the innermost edge of a square pattern forming the second conductive line 712 are spaced apart from each other by about 1 mm. Accordingly, the outermost edge of a square pattern forming the first conductive line 711 and the innermost edge of a square pattern forming the second conductive line 712 are not overlapped (or in contact).

In at least one example embodiment, the first conductive line 711 is formed on a top surface of a film, and the second conductive line 712 is formed on a bottom surface of the film. Alternatively, the first conductive line 711 and the second conductive line 712 may be formed on a top or bottom surface of the film. For example, the first conductive line 711 and the second conductive line 712 may be formed on a flip cover of a mobile phone (or, a smart phone).

While the inventive concepts have been described with reference to example embodiments, it will be apparent to those skilled in the art that various changes and modifications may be made without departing from the spirit and scope of the inventive concepts. Therefore, it should be understood that the above example embodiments are not limiting, but illustrative.

What is claimed is:

1. A near field communication (NFC) antenna matching network system connected to an NFC transceiver, the NFC antenna network matching system comprising:
   a matching circuit connected to first and second antenna terminals and to the NFC transceiver, the matching circuit being configured to match impedances of the NFC antenna network matching system and the NFC transceiver; and
   a plurality of NFC antennas connected in parallel with the first and second antenna terminals,
   wherein each of the NFC antennas includes,
      a source coil connected between the first antenna terminal and the second antenna terminal, and
      a resonance coil physically separated from the source coil and configured to exchange signals with the source coil via inductive coupling.

2. The NFC antenna matching network system of claim 1, wherein the matching circuit comprises:
   a first capacitor connected between the first antenna terminal and the NFC transceiver;
   a second capacitor connected between the second antenna terminal and the NFC transceiver.

3. The NFC antenna matching network system of claim 2, wherein the matching circuit comprises:
   at least one of a first resistor and a first inductor connected between the first capacitor and the first antenna terminal; and
   at least one of a second resistor and a second inductor connected between the second capacitor and the second antenna terminal.

4. The NFC antenna matching network system of claim 3, wherein each of the NFC antennas further comprises:
   a third capacitor connected in parallel with the resonance coil.

5. The NFC antenna matching network system of claim 4, wherein at least one of a third resistor and a third inductor is connected in series between the resonance coil and the third capacitor.

6. The NFC antenna matching network system of claim 5, wherein the resonance coil of each of the NFC antennas and the third capacitor form a parallel resonator for each of the NFC antennas,
   wherein the source coil of each of the NFC antennas and the first and second capacitors form a serial resonator for each of the NFC antennas, and
   wherein the parallel resonator of each of the NFC antennas is physically separated from the serial resonator of each of the NFC antennas.

7. The NFC antenna matching network system of claim 1, wherein the source coil of each of the NFC antennas is a first conductive line having one of a single-loop shape and a multi-loop shape, and
   wherein the resonance coil of each of the NFC antennas is a second conductive line having a spiral shape.

8. The NFC antenna matching network system of claim 7, wherein antenna areas where the NFC antennas are located have different sizes, and each of the NFC antennas has a different size.

9. A user device comprising:
   a near field communication (NFC) transceiver; and
   an NFC antenna matching network system connected to the NFC transceiver,
   wherein the NFC antenna matching network system includes,
   a first capacitor connected between a first terminal of the NFC transceiver and a first antenna terminal,
   a second capacitor connected between a second terminal of the NFC transceiver and a second antenna terminal,
   a plurality of source coils connected in parallel between the first antenna terminal and the second antenna terminal, and
   a plurality of parallel resonators corresponding to the source coils, each of the parallel resonators being physically separated from a corresponding one of the plurality of source coils.

10. The user device of claim 9, wherein the plurality of source coils includes at least first and second source coils,
    wherein the plurality of parallel resonators includes at least first and second parallel resonators, and
    wherein the first source coil and the first parallel resonator form a first NFC antenna, and the second source coil and the second parallel resonator form a second NFC antenna.

11. The user device of claim 10, wherein antenna areas where the first and second NFC antennas are located have different sizes, and each of the NFC antennas has a different size.

12. The user device of claim 11, wherein the first and second NFC antennas are disposed at different locations of the user device.

13. The user device of claim 9, wherein each of the parallel resonators includes a resonance coil and a capacitor connected in parallel with the resonance coil.

14. The user device of claim 13, wherein each of the source coils is a first conductive line having one of a single-loop shape and a multi-loop shape, and the resonance coil of each of the parallel resonators is a second conductive line having a spiral shape.

15. A device, comprising:
 at least one antenna including a serial resonator and a parallel resonator electrically isolated from each other and configured to exchange signals via inductive coupling;
 a transceiver configured to receive and transmit the exchanged signals; and
 a matching circuit electrically connected between the transceiver and the serial resonator, the matching circuit being configured to match impedances within the device.

16. The device of claim 15, wherein the at least one antenna is a plurality of antennas,
 wherein each of the plurality of antennas having a different size, and
 wherein the serial resonators of the plurality of antennas are connected in parallel with one another.

17. The device of claim 15, wherein the at least one antenna is a plurality of antennas, each of the plurality of antennas having a different size, and
 wherein the serial resonators of the plurality of antennas are connected in series with one another.

18. The device of claim 15, wherein the serial resonator includes a first coil, and
 wherein the matching circuit includes a first capacitor and a second capacitor, the first capacitor being connected between a first end of the first coil and the transceiver, the second capacitor being connected between a second end of the first coil and the transceiver.

19. The device of claim 18, wherein the parallel resonator includes a second coil connected in parallel with a capacitance.

* * * * *